(12) United States Patent
Kozaki

(10) Patent No.: US 7,355,833 B2
(45) Date of Patent: Apr. 8, 2008

(54) MAGNETIC BEARING DEVICE

(75) Inventor: Junichiro Kozaki, Hadano (JP)

(73) Assignee: Shimadzu Corporation, Kyoto (JP)

( * ) Notice: Subject to any disclaimer, the term of this patent is extended or adjusted under 35 U.S.C. 154(b) by 377 days.

(21) Appl. No.: 11/128,286

(22) Filed: May 13, 2005

(65) Prior Publication Data

US 2005/0218885 A1    Oct. 6, 2005

(51) Int. Cl.
*H01H 47/00* (2006.01)
(52) U.S. Cl. ...................... 361/139; 361/143
(58) Field of Classification Search ............. 361/139, 361/143, 144; 310/90.5
See application file for complete search history.

(56) References Cited

U.S. PATENT DOCUMENTS 6,515,388 B1 * 2/2003 Moriyama et al. ......... 310/90.5
6,589,030 B2 * 7/2003 Ozaki .......................... 417/420
6,787,955 B1 * 9/2004 Ueyama ..................... 310/90.5

* cited by examiner

*Primary Examiner*—Michael Sherry
*Assistant Examiner*—Danny Nguyen
(74) *Attorney, Agent, or Firm*—Manabu Kanesaka

(57) ABSTRACT

A magnetic bearing device includes an electromagnet for supporting a member without contact; an excitation amplifier for supplying an excitation current to the electromagnet; a carrier wave generation device for generating a carrier wave; and a sensor device for modulating the carrier wave to output a sensor signal according to a position of the member. An A/D conversion device converts the sensor signal to a digital value, and a demodulation calculation device demodulates through a digital calculation process according to the sensor signal converted to the digital value. A control device controls the excitation amplifier according to a calculation result of the demodulation calculation device.

12 Claims, 21 Drawing Sheets

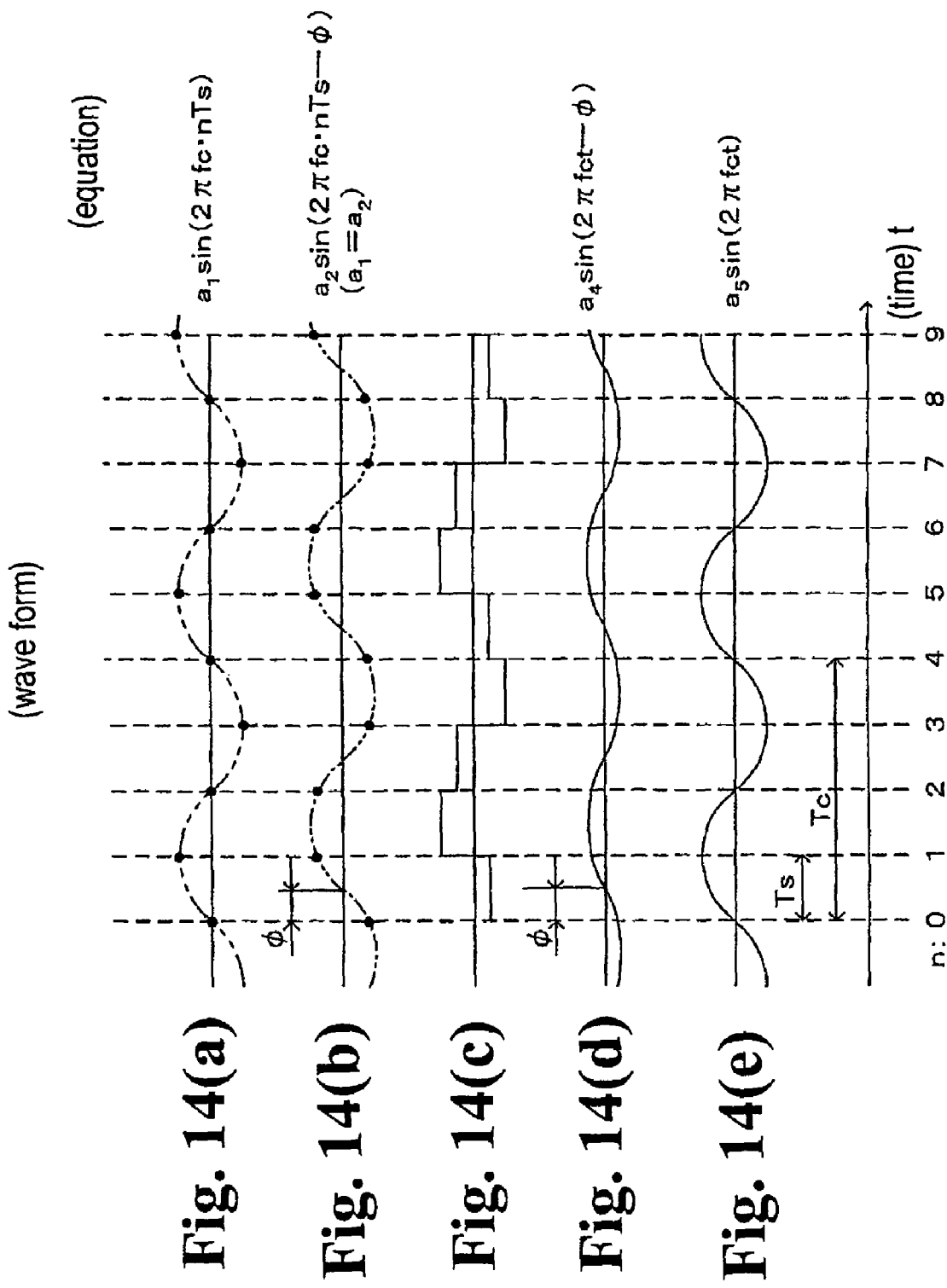

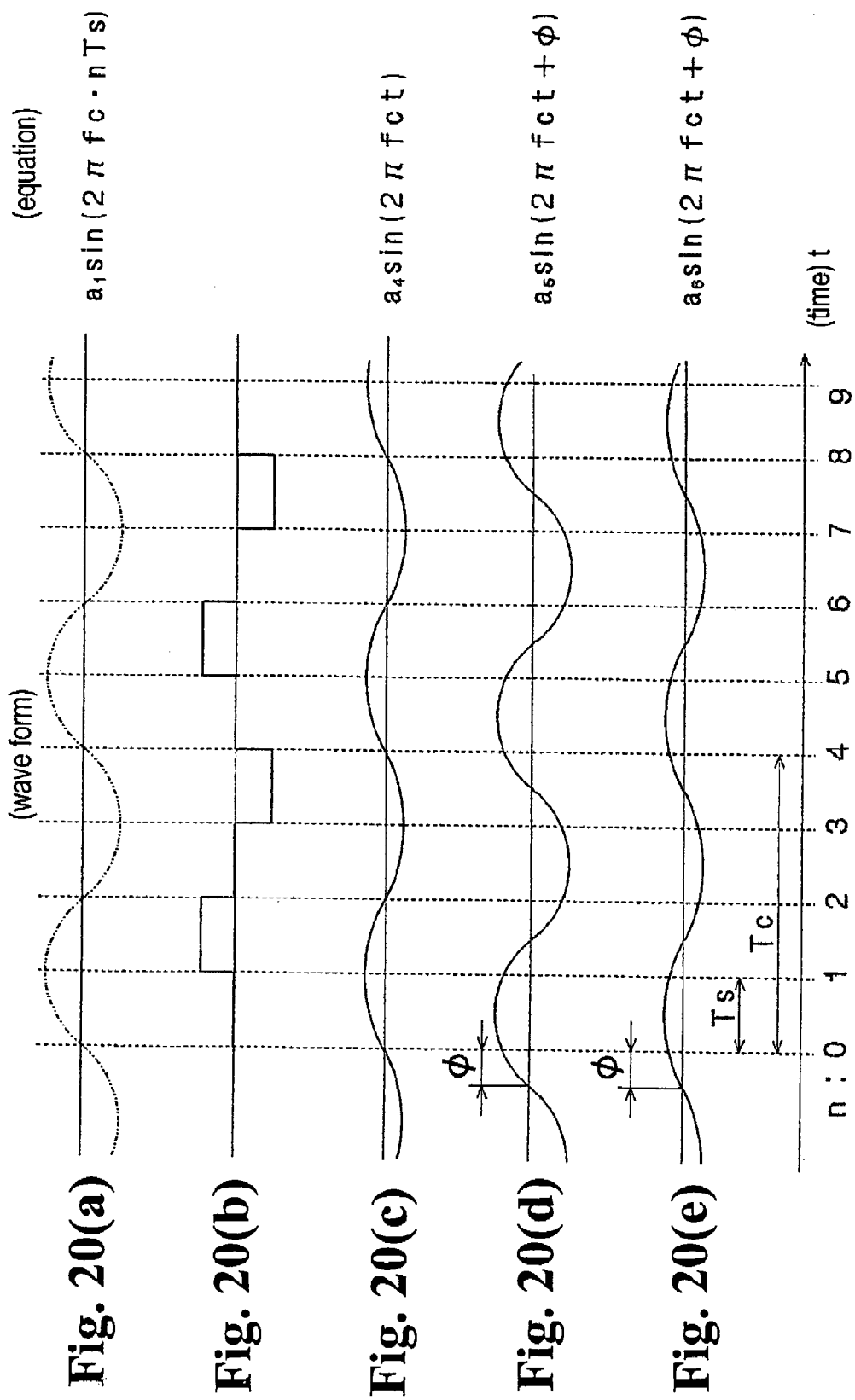

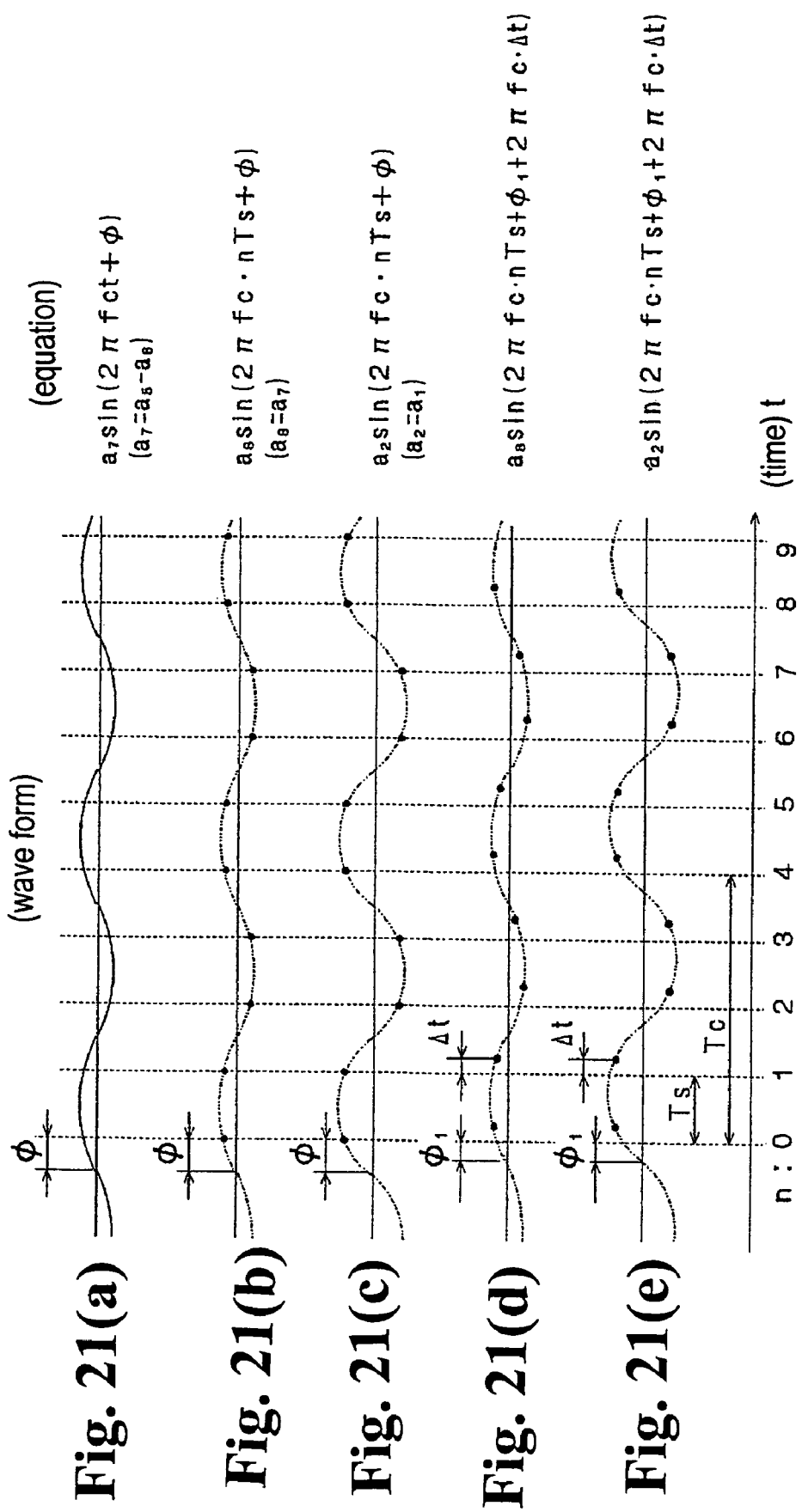

MAGNETIC BEARING DEVICE

BACKGROUND OF THE INVENTION AND RELATED ART STATEMENT

The invention relates to a magnetic bearing device for a turbo-molecular pump and a machining device.

A turbo-molecular pump or a machining tool requires high speed rotation with low vibration, and a magnetic bearing device is provided as a bearing. In general, a magnetic bearing device of a five-axis control type has been used for a rotating member, in which four axes are disposed in a radial direction and one axis is disposed in an axial direction. Each axis is provided with an electromagnet and a displacement sensor as a unit. The displacement sensor typically includes an inductance type sensor for detecting a displacement of a rotating member. In many cases, an opposed type sensor has been disposed in the radial direction, and a non-opposed type sensor has been disposed in the axial direction. A carrier wave is applied to the displacement sensors, and the carrier wave is modulated in amplitude according to a change in impedance of the sensor units. The modulated signal is used for controlling an excitation current of the electromagnets.

The displacement sensor disposed in the axial direction is not the opposed type, so that an offset value of the sensor signal tends to fluctuate due to a change in floating capacitance of the sensor unit or a signal line. In particular, when a cable between the magnetic bearing device and a controller is replaced, the offset value tends to fluctuate greatly due to a change in floating capacitance of the cable. Accordingly, it is necessary to adjust the offset value every time when the cable is replaced. In order to eliminate the adjustment of the offset value, the carrier wave tends to have a lower frequency.

The sensor signal is filtered to remove a basic wave and a harmonic component of the carrier wave from the modulated signal. When the carrier wave has a lower frequency, the frequency of the carrier wave becomes closer to a required frequency range of the sensor signal. Accordingly, it is necessary to eliminate a phase delay of the required frequency range and to use a notch filter instead of a low-pass filter, so that magnetic levitation is properly controlled. As a result, a circuit size tends to become large.

In view of the problems described above, an object of the present invention is to provide a magnetic bearing device capable of lowering a frequency of the carrier wave while reducing a circuit size.

Further objects and advantages of the invention will be apparent from the following description of the invention.

SUMMARY OF THE INVENTION

In order to attain the objects described above, according to a first aspect of the present invention, a magnetic bearing device includes an electromagnet for supporting a member without contact; an excitation amplifier for supplying an excitation current to the electromagnet; a carrier wave generation device for generating a carrier wave; a sensor for modulating the carrier wave to output a sensor signal according to a position of the member; an A/D conversion device for converting the sensor signal to a digital value; a demodulation calculation device for demodulating through a digital calculation process according to the sensor signal converted to the digital value; and a control device for controlling the excitation amplifier according to a calculation result of the demodulation calculation device.

According to a second aspect of the present invention, a magnetic bearing device includes an electromagnet for supporting a member without contact; an excitation amplifier for supplying an excitation current to the electromagnet; a carrier wave generation device for generating a carrier wave; a pair of sensors disposed with the member in between for modulating the carrier wave to output sensor signals according to a position of the member; a difference calculation device for calculating a difference of the sensor signals from the pair of sensors; an A/D conversion device for converting the difference to a digital value; a demodulation calculation device for demodulating through a digital calculation process according to the difference converted to the digital value; and a control device for controlling the excitation amplifier according to a calculation result of the demodulation calculation device.

According to a third aspect of the present invention, a magnetic bearing device includes an electromagnet for supporting a member without contact; an excitation amplifier for supplying an excitation current to the electromagnet; a carrier wave generation device for generating a carrier wave; a sensor for modulating the carrier wave to output sensor signals according to a position of the member; a standard signal generation device for generating a carrier wave standard signal with specific amplitude according to the carrier wave; a difference calculation device for calculating a difference between the sensor signal and the carrier wave standard signal; an A/D conversion device for converting the difference to a digital value; a demodulation calculation device for demodulating through a digital calculation process according to the difference converted to the digital value; and a control device for controlling the excitation amplifier according to a calculation result of the demodulation calculation device.

According to a fourth aspect of the present invention, in the magnetic bearing device in the third aspect, a phase shift device is provided for shifting a phase of the carrier wave standard signal, so that the carrier wave standard signal has a phase substantially same as that of the sensor signal.

According to a fifth aspect of the present invention, in the magnetic bearing device in one of the second to fourth aspects, the demodulation calculation device includes a sine wave discrete value generation unit for generating a sine wave discrete value through a digital calculation process; a multiplication unit for multiplying the sine wave discrete value and the difference converted to the digital value; and a low-pass calculation unit for performing a low-pass process relative to a multiplication result of the multiplication unit. The carrier wave generation device includes a phase shift calculation device for shifting a phase of the sine wave discrete value through a digital calculation process, so that the sine wave discrete value has a phase substantially same as that of the difference; and a D/A conversion unit for converting the sine wave discrete value with the shifted phase through D/A conversion to generate the carrier wave. The control device controls the excitation amplifier according to a calculation result of the low-pass calculation unit.

According to a sixth aspect of the present invention, in the magnetic bearing device in one of the third and fourth aspects, the demodulation calculation device includes a sine wave discrete value generation unit for generating a sine wave discrete value through a digital calculation process; a cosine wave discrete value generation unit for generating a cosine wave discrete value through a digital calculation process; a multiplication unit for dividing the difference converted to the digital value into two differences, multiplying the sine wave discrete value and one of the two differences, and multiplying the cosine wave discrete value and the other of the two differences; a low-pass calculation unit for performing a low-pass process relative to each of multiplication results of the multiplication unit; and a combine calculation unit for calculating squares of each of multiplication results of the low-pass calculation unit, and calculating a root square of a sum of the squares. The control device controls the excitation amplifier according to a calculation result of the combine calculation unit.

According to a seventh aspect of the present invention, a magnetic bearing device includes an electromagnet for supporting a member without contact; an excitation amplifier for supplying an excitation current to the electromagnet; a carrier wave generation device for generating a carrier wave; a pair of sensors disposed with the member in between for modulating the carrier wave to output sensor signals according to a position of the member; a standard signal generation device for generating a carrier wave standard signal with specific amplitude according to the carrier wave; a difference calculation device for calculating differences of the sensor signals from the pair of sensors and the carrier wave standard signal, respectively; an A/D conversion device for converting each of the differences calculated by the difference calculation device to a digital value; a sine wave discrete value generation unit for generating a sine wave discrete value relative to each of the differences converted to the digital value; a cosine wave discrete value generation unit for generating a cosine wave discrete value relative to each of the differences converted to the digital value; a multiplication unit for dividing each of the differences converted to the digital value into two divided signals, multiplying the sine wave discrete value and one of the two divided signals, and multiplying the cosine wave discrete value and the other of the two divided signals; a low-pass calculation unit for performing a low-pass process relative to each of multiplication results of the multiplication unit; a combine calculation unit for calculating squares of each of multiplication results of the low-pass calculation unit, and calculating a root square of a sum of the squares; a demodulation calculation device for calculating a difference of multiplication results of the combine calculation unit to perform a demodulation calculation; and a control device for controlling the excitation amplifier according to a calculation result of the demodulation calculation device.

According to an eighth aspect of the present invention, the magnetic bearing device in one of the second to fourth aspects further includes a plurality of sensors for controlling multi-axis. The carrier wave generation device includes a sine wave discrete value generation unit for generating a sine wave discrete value through a digital calculation process; and a D/A conversion unit for converting the sine wave discrete value through D/A conversion to generate the carrier wave, and sending the carrier wave to each of the sensors.

According to a ninth aspect of the present invention, in the magnetic bearing device in the eighth aspect, the demodulation calculation device includes a phase shift calculation unit for shifting a phase of the sine wave discrete value through a digital calculation process relative to each of the differences converted to the digital value, so that each of the sine wave discrete values has a phase substantially same as that of each of the differences converted to the digital value; a multiplication unit for multiplying each of the differences converted to the digital value and each of the sine wave discrete values with each of the phases shifted by the phase shift calculation unit; and a low-pass calculation unit for performing a low-pass process relative to each of multiplication results of the multiplication unit. The control device controls the excitation amplifier according to calculation results of the low-pass calculation unit.

According to a tenth aspect of the present invention, in the magnetic bearing device in one of the fifth and ninth aspects, the phase shift calculation unit shifts the phase of the sine wave discrete value, so that the sine wave discrete value to be multiplied by the multiplication unit has a phase substantially inverted one of the differences, instead of same one of the differences.

According to an eleventh aspect of the present invention, the magnetic bearing device in one of the fifth to tenth aspects further includes a filter calculation device for performing a band-pass calculation process or a high-pass calculation process relative to the differences converted to the digital value by the A/D conversion device to send a signal after the process to the multiplication unit.

BRIEF DESCRIPTION OF THE DRAWINGS

FIGS. 14(a) to 14(e) are charts showing a signal wave and an equation thereof at 14(a) to 14(e) in FIG. 13, respectively;

FIGS. 20(a) to 20(e) are charts showing a signal wave and an equation thereof at 20(a) to 20(e) in FIGS. 18 and 19, respectively; and FIGS. 21(a) to 21(e) are charts showing a signal wave and an equation thereof at 21(a) to 21(e) in FIGS. 18 and 19, respectively.

DETAINED DESCRIPTION OF PREFERRED EMBODIMENTS

Figure 1:
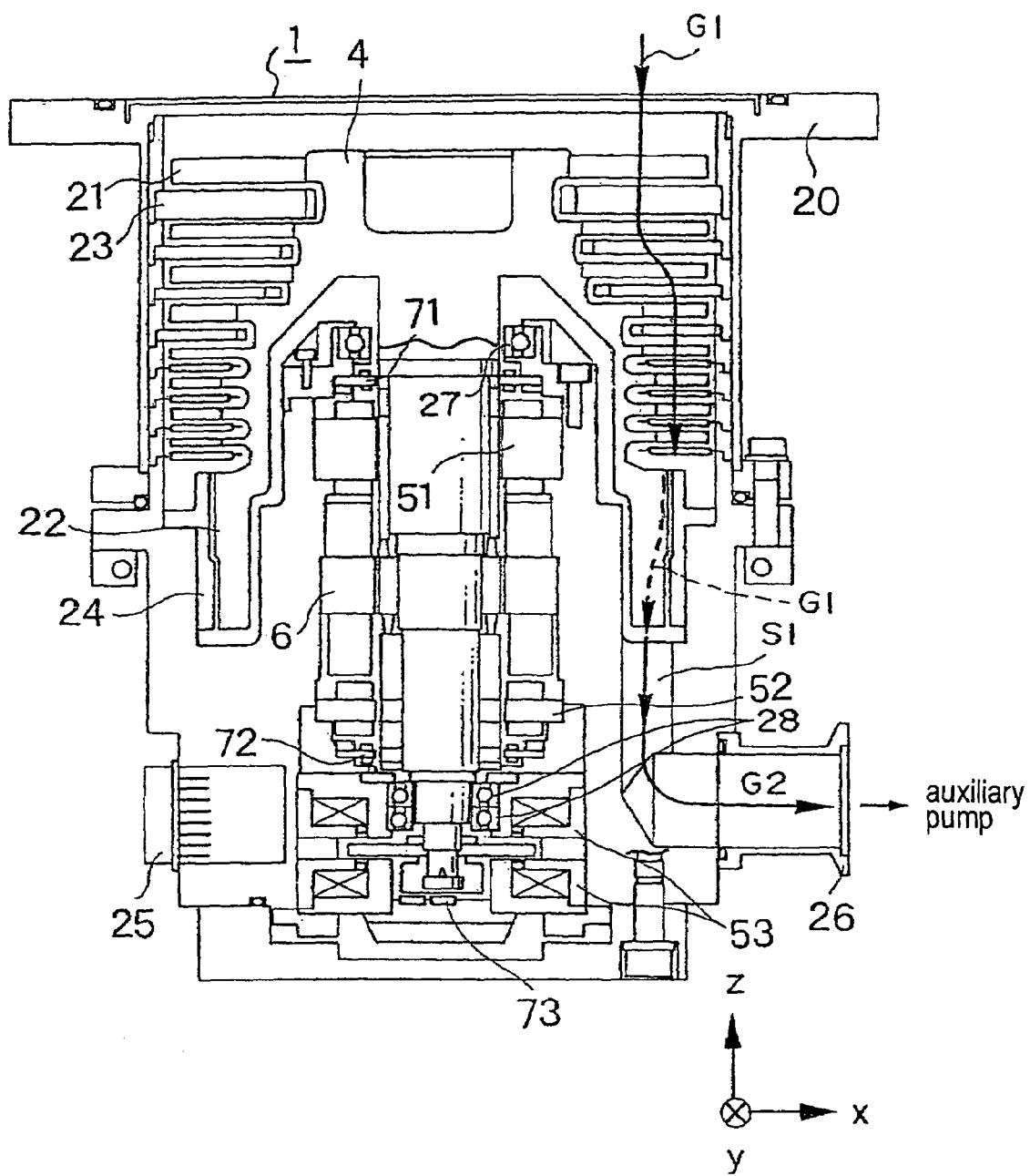
FIG. 1 is a cross sectional view of a magnetic bearing-type turbo-molecular pump with a magnetic bearing device according to a first embodiment of the present invention.

Hereunder, embodiments of the present invention will be explained with reference to the accompanied drawings. FIG. 1 is a cross sectional view of a magnetic bearing-type turbo-molecular pump with a magnetic bearing control device according to a first embodiment of the present invention. In a casing 20 of a pump main body 1, there are provided a rotor 4 having a plurality of rotor blades 21 at different levels and a thread groove portion 22; stator blades 23 alternately provided relative to the rotor blades 21; and a cylindrical member 24 facing the thread groove portion 22. Electromagnets 5 for supporting the rotor 4 without contact include electromagnets 51 and 52 constituting a radial magnetic bearing; and electromagnets 53 constituting an axial magnetic bearing, thereby constituting a five-axis control-type magnetic bearing.

Radial displacement sensors 71 and 72 and an axial displacement sensor 73 are provided relative to the radial electromagnets 51 and 52 and the axial electromagnets 53, respectively. The pump main body 1 is driven by a controller (not shown), and a cable (not shown) connecting the controller and the pump main body 1 is connected to a receptacle 25. When a motor 6 drives the rotor 4 while the rotor 4 is supported on the electromagnets 51, 52, and 53 without contact, gas is exhausted from a side of a gas inlet flange 20 to a back pressure side (space S1) as shown by an arrow G1. An auxiliary pump connected to a gas outlet flange 26 discharges gas exhausted to the back pressure side to outside.

Reference numerals 27 and 28 denote emergency mechanical bearings. When the rotor 4 is not levitated magnetically, the rotor 4 is supported on the bearings 27 and 28. In an emergency, the bearing 27 restrains the rotor 4 in two axes (x axis and y axis) in a radial direction, and the bearings 28 restrain the rotor 4 in two axes (x axis and y axis) in a radial direction and one axis (z axis) in a thrust direction.

Figure 2:
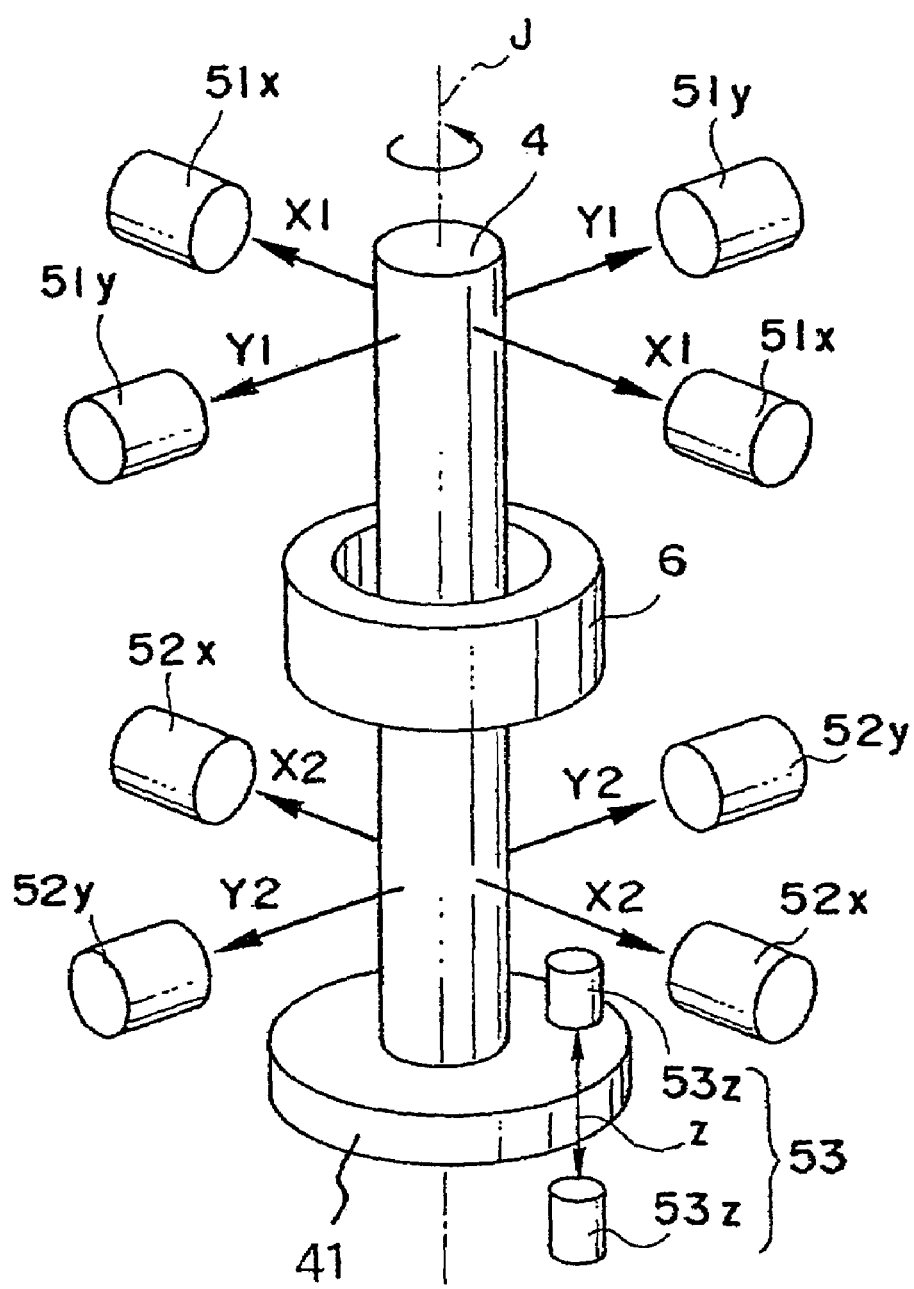
FIG. 2 is a schematic diagram showing a magnetic bearing of a five-axis control type.

FIG. 2 is a schematic diagram showing a magnetic bearing of a five-axis control type, wherein a rotational axis J of the rotor 4 is aligned with the z axis. The radial electromagnets 51 shown in FIG. 1 include: a pair of electromagnets 51x relative to the X axis; and a pair of electromagnets 51y relative to the y axis. The radial electromagnets 52 include: a pair of electromagnets 52x relative to the X axis; and a pair of electromagnets 52y relative to the y axis. The axial electromagnets 53 include a pair of electromagnets 53z oppositely sandwiching a disk 41 provided at a lower end of the rotor 4 along the z axis.

The displacement sensors 71 and 72 shown in FIG. 1 are formed of a pair of radial displacement sensors corresponding to the electromagnets 51x, 51y, 52x, and 52y, respectively. The five pairs of electromagnets 51x, 51y, 52x, 52y, and 53, and the displacement sensors 71 to 73 constitute the five-axis control-type magnetic bearing.

Figure 3:
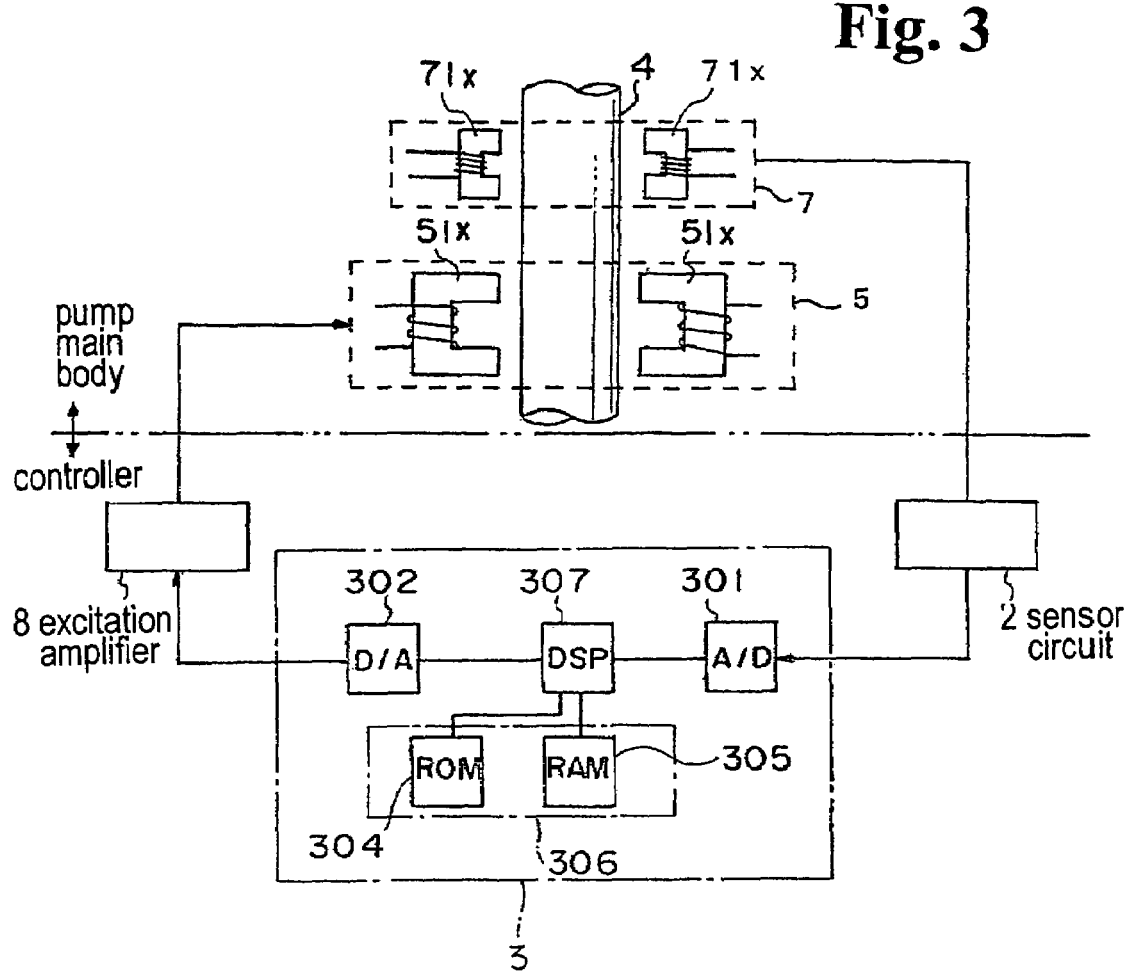
FIG. 3 is a block diagram showing a configuration of a magnetic levitating control system of the magnetic bearing device.

FIG. 3 is a block diagram showing a configuration of a magnetic levitating control system of the magnetic bearing device. Only one axis of the magnetic bearing in the radial direction is shown. The electromagnets 5 include a pair of the radial electromagnets 51x, and the displacement sensors 7 include the radial displacement sensor 71x corresponding to the electromagnets 51x. The displacement sensors 7 are inductance-type sensors, in which a gap displacement is converted to an electronic signal by using a change in impedance of the sensor portion due to a change in the gap displacement. A surface of the rotor 4 opposite to the sensors is formed of a ferromagnetic material or conductive material.

The controller for driving the pump main body 1 is provided with a sensor circuit 2, a control circuit 3, and an excitation amplifier 8. The control circuit 3 is provided with an A/D converter 301, a D/A converter 302, a digital signal processor (DSP) 307 as a calculation unit, and a storage unit 306 having an ROM 302 and an RAM 305. A carrier wave with a frequency of a few tens of kHz is applied to the displacement sensors 7 from the sensor circuit 2, and the carrier wave is modulated in amplitude thereof according to a change in impedance of the sensor unit due to a gap displacement. The amplitude modulated wave (AM wave) is input to the control circuit 3 through the sensor circuit 2 as a sensor signal. In the case of the radial displacement sensors 71x, the sensor circuit 2 calculates a difference of the sensor signals from each of the radial displacement sensors 71x, and the difference is input to the control circuit 3 as the sensor signal.

The A/D converter 301 converts the analog sensor signal input to the control circuit 3 to a digital value, and inputs the digital value to the DSP 307. The storage unit 306 stores a magnetic levitation control parameter in advance, and the DSP 307 calculates an excitation current to be supplied to the electromagnets 5 based on the output of the displacement sensors 7 and the magnetic levitation control parameter. For example, when the rotor 4 is levitated at a position shifted to a left side from an optimal position, the excitation current supplied to the electromagnets 51x at a right side increases, so that the rotor 4 is levitated at the optimal position. An amount of the current control is calculated through a PID calculation. The DSP 307 outputs a control signal according to the excitation current to be supplied, and the D/A converter 302 converts the control signal to an analog value and inputs the control signal to the excitation amplifier 8.

Figure 4:
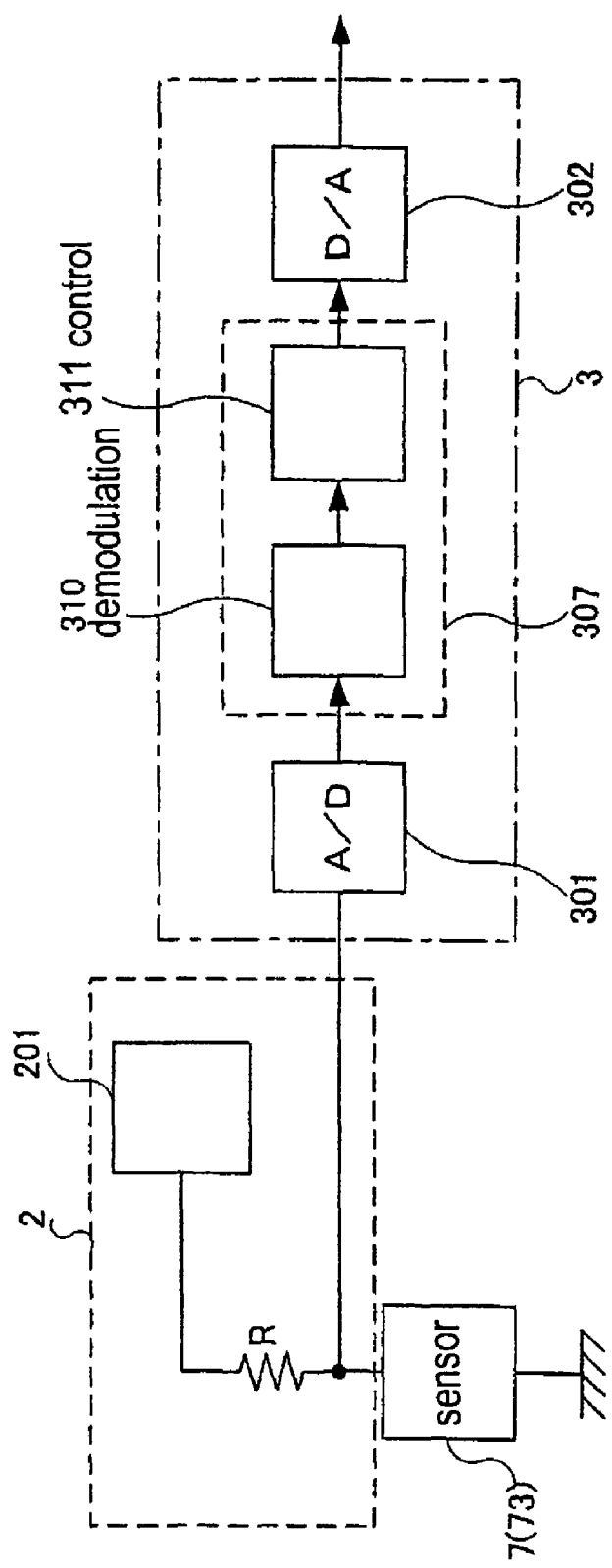
FIG. 4 is a block diagram showing a configuration of a sensor circuit and a digital signal processor (DSP) relative to an axial axis.

FIG. 4 is a block diagram showing a configuration of the sensor circuit 2 and the DSP 307. The sensor circuit 2 is provided with a carrier wave generation unit 201, so that the generated carrier wave is applied to the displacement sensor 7 (73) connected in series through a resistance R. The displacement sensor 7 outputs the AM wave modulated according to the change in the impedance, and the A/D converter 301 converts the AM wave to a digital signal. A demodulation calculation unit 310 of the DSP 307 demodulates the converted sensor signal. The DSP 307 performs a process of removing harmonics generated in the rectification to retrieve a displacement signal component, and a gain-offset correction process. A control calculation unit 311 calculates a current control amount based on the displacement signal component obtained by the modulation calculation unit 310.

Figure 5:
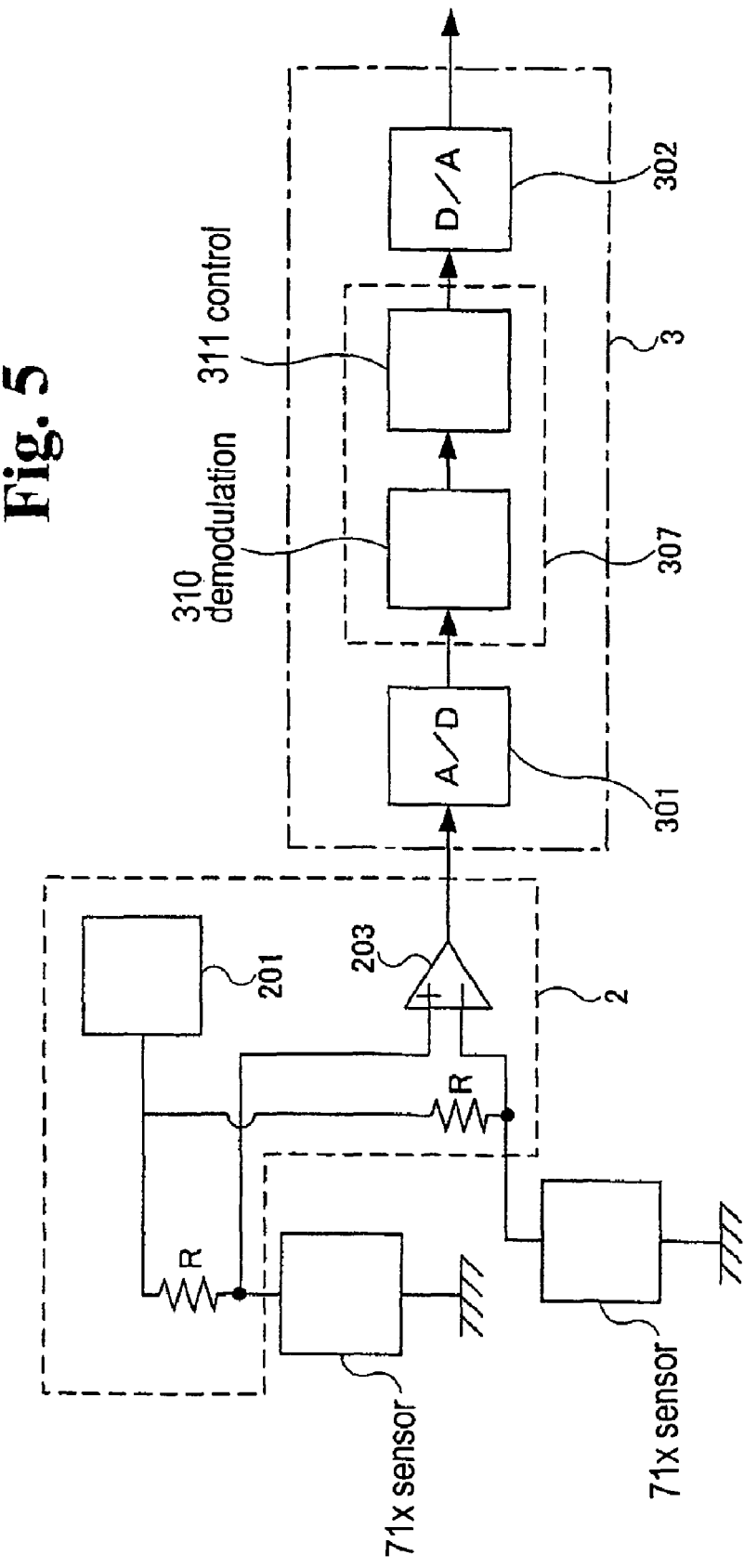
FIG. 5 is a block diagram showing a configuration of a sensor circuit and a digital signal processor (DSP) relative to a radial axis.

FIG. 4 shows the axial displacement sensor 73 as an example, and FIG. 5 shows the radial displacement sensors 71x formed of a pair of displacement sensors. In this case, a difference of signals from the radial displacement sensors 71x is obtained to improve linearity of the sensor signals. The AM waves from the radial displacement sensors 71x are input to a difference amplifier 203 to obtain the difference signal of the AM waves. The A/D converter 301 converts the difference signal to digital value. A process afterward is the same as that shown in FIG. 4.

Figure 6:
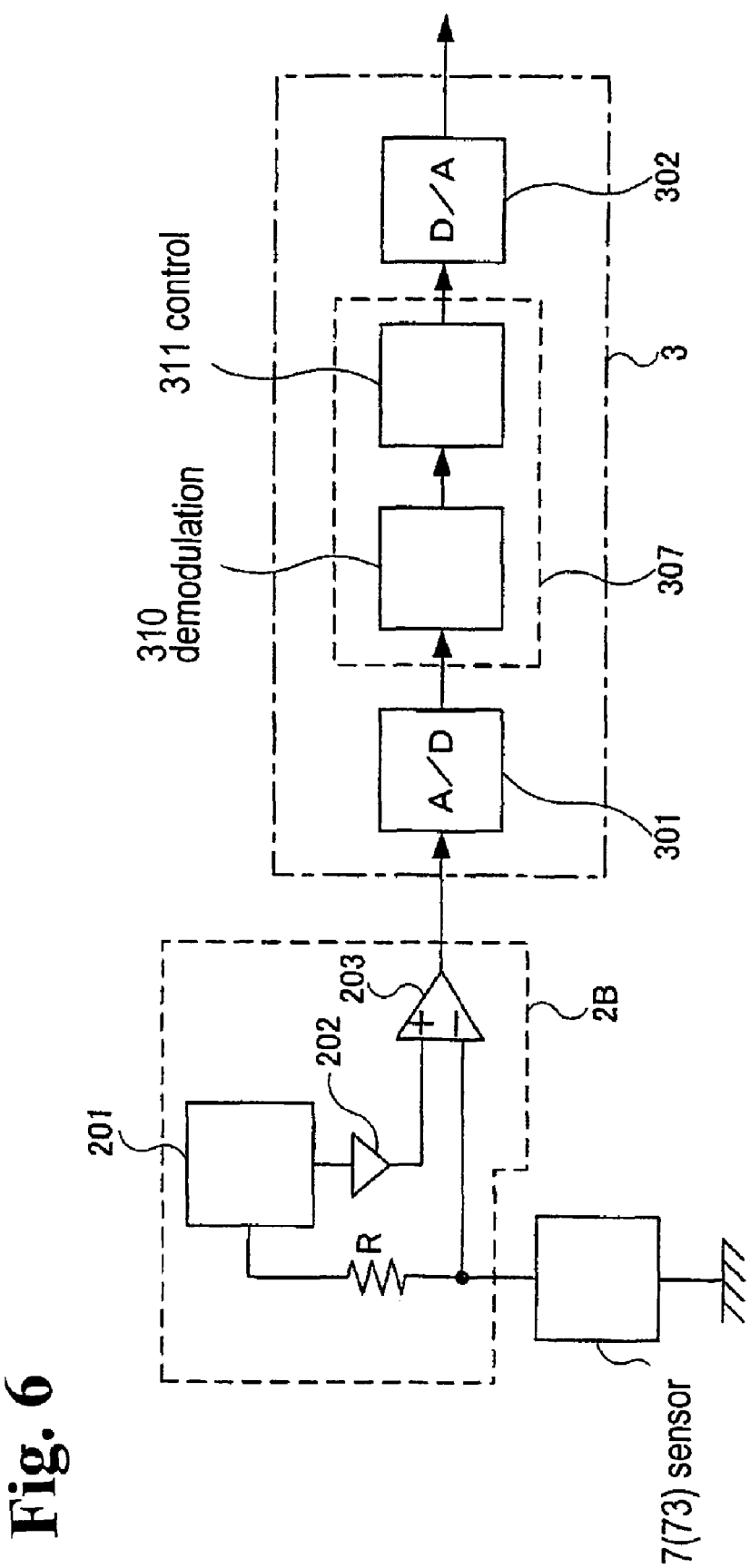
FIG. 6 is a block diagram showing a modified configuration of the control system shown in FIG. 4.

FIG. 6 is a block diagram showing a modified configuration of the control system shown in FIG. 4. In FIG. 6, the DSP 307 has a configuration same as that in FIG. 4, and a sensor circuit 2B has a configuration different from that of the sensor circuit 2 in FIG. 4. The sensor circuit 2B is provided with the difference amplifier 203 for receiving the AM wave from the displacement sensor 7 (73) and a signal with constant amplitude generated from the carrier wave (carrier wave standard signal). A difference between the AM wave and the carrier wave standard signal is input to the A/D converter 301 from the difference amplifier 203. A gain correction unit 202 corrects the carrier wave from a carrier wave generation unit 201 to obtain the carrier wave standard signal.

When the carrier wave standard signal is given by $\alpha \cdot \sin(\omega t)$ and the sensor signal is given by $\alpha \gamma \cdot \sin(\omega t + \beta)$, the difference signal between the carrier wave standard signal and the sensor signal is given by the following equation, wherein $\beta$ is a phase shift.

The difference signal=$C \cdot \sin(\omega t - \Phi)$ $C = \alpha \{(1-\gamma)^2 + 2\gamma \cdot (1-\cos \beta)\}^{0.5}$ $\Phi = \tan^{-1}\{\gamma \cdot \sin \beta / (1 - \gamma \cos \beta)\}$ When the phase shift $\beta$ is zero, the amplitude of the difference signal becomes $\alpha|1-\gamma|$. That is, when each of the signals has the same amplitude ($\gamma=1$), the amplitude of the difference signal becomes minimum. As a difference in the amplitude between the signals increases, the amplitude of the difference signal increases in the same sign. Accordingly, when the difference signal of the signals is modulated, only information regarding a magnitude of a displacement of the rotor is obtained, and no information regarding in a displacement direction is obtained.

In the control system shown in FIG. 6, a variable range of the sensor signal corresponding to a variable range of the displacement of the rotor is obtained in advance. The carrier wave standard signal is set to have the constant amplitude beyond a maximum value of the variable range of the sensor signal, or below a minimum value of the variable range of the sensor signal. Accordingly, within the variable range of the rotor displacement, the amplitude of the difference signal increases or decreases monotonously relative to the rotor displacement. In this case, a center value of the variable range of the sensor signal may be set to be an average of a value of the sensor signal corresponding to a maximum value of the variable range of the rotor displacement and a value of the sensor signal corresponding to a minimum value of the variable range of the rotor displacement, so that it is possible to obtain the information regarding the displacement direction. Usually, the center value is off-set adjusted so that the average of the maximum and the minimum becomes zero.

The displacement sensors 7 of the inductance type provide a small change in the amplitude of the carrier wave according to the displacement, thereby providing a small adjustable range of the amplitude of the carrier wave. Accordingly, when the sensor signals are directly converted and the DSP 307 performs the modulation process, a quantization error in the A/D conversion becomes an issue. Further, a noise component (aliasing) is generated at a turning point of harmonics having frequencies higher than a half of a sampling frequency. When the adjustable range of the amplitude is small, a level of the sensor signal becomes smaller relative to the noise component, thereby reducing an S/N ratio.

In the control system shown in FIG. 6, the difference amplifier 203 obtains the difference between the sensor signal and the carrier wave standard signal with the constant amplitude, thereby removing a non-variable component from the sensor signal. In this case, the control signal is calculated based on a variable component in the sensor signal converted to a digital value, thereby improving the S/N ratio. In the control system of the radial axis shown in FIG. 5, the difference signal between the opposing displacement sensors 71x is obtained, thereby improving the S/N ratio, different from the case shown in FIG. 4.

When the displacement sensors 7 have large inductance, the phase shift ($\beta$) of the sensor output signal (AM wave) relative to the carrier wave standard signal becomes large, thereby receiving a large influence of the phase shift of the difference signal. When there is the phase shift ($\beta \neq 0$), a displacement variable component $(1-\gamma)^2$ of the amplitude C becomes small relative to $2\gamma \cdot (1-\cos\beta)$, thereby deteriorating the S/N ratio. Therefore, a phase shift unit 204 is provided in the sensor circuit 2B in FIG. 7 for shifting the phase of the carrier wave standard signal such that the phase shift relative to the sensor signal becomes substantially zero. In this case, the phase shift $\beta$ of the sensor signal relative to the carrier wave is not changed, and the phase of the carrier wave standard signal is shifted to match to the sensor signal.

Figure 7:
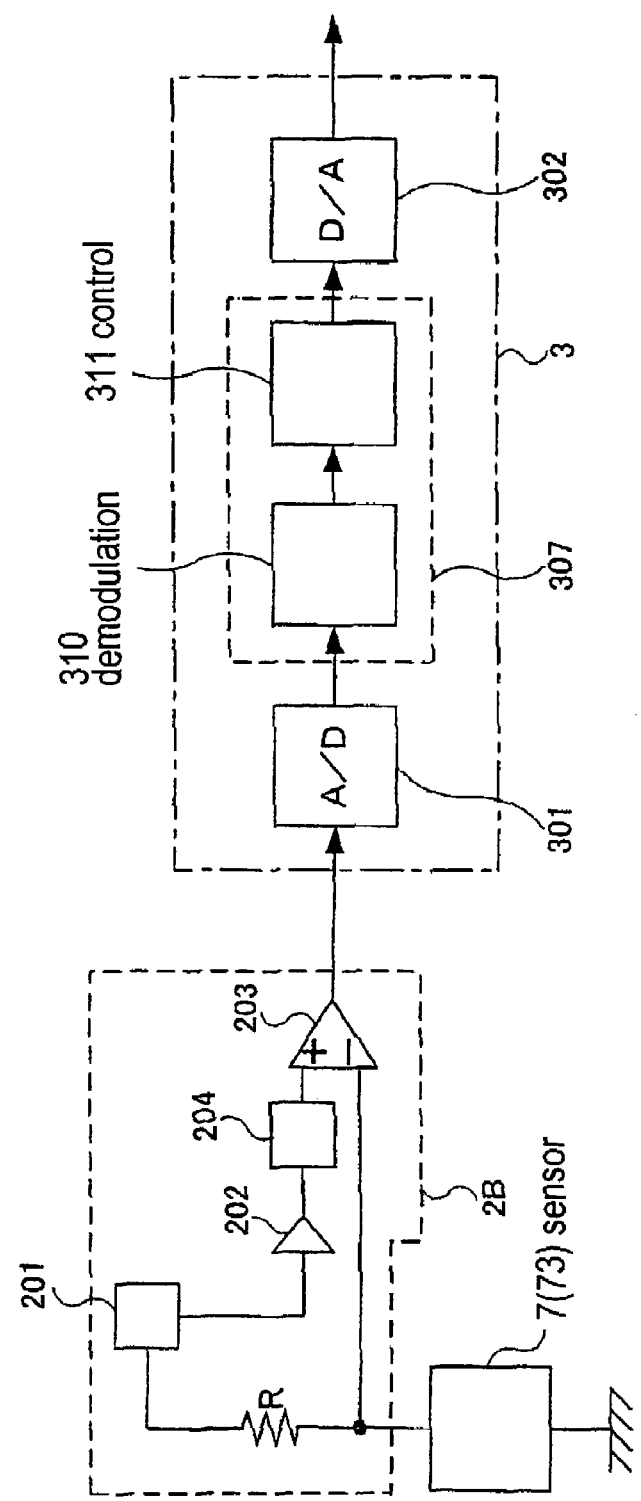
FIG. 7 is a block diagram showing a control system with a phase shift circuit.
Figure 8:
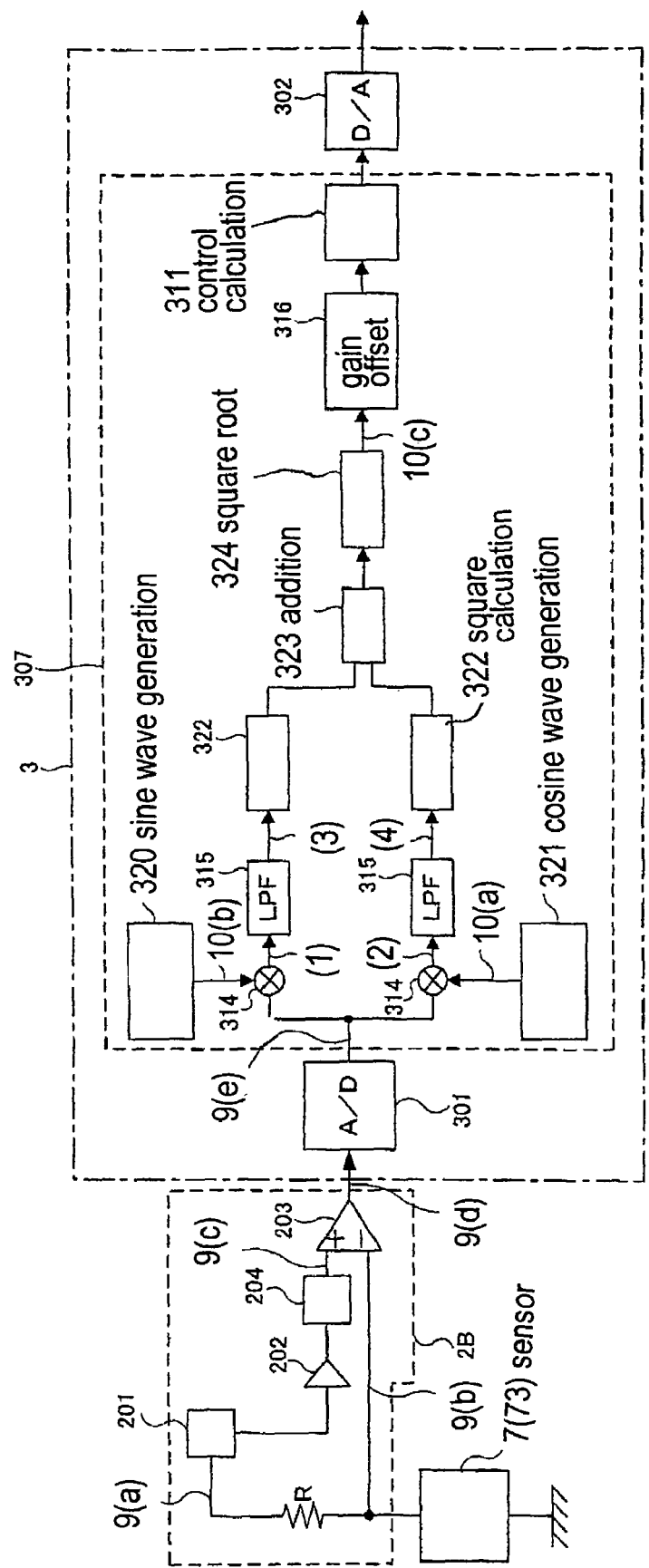
FIG. 8 is a block diagram showing a process in a modulation calculation unit shown in FIG. 7.

The modulation calculation in the DSP 307 will be explained in detail next with reference to a control system shown in FIG. 7 as an example. The modulation calculation is applicable to the control systems shown in FIGS. 4 to 6. FIG. 8 is a block diagram showing a process in the modulation calculation unit 310 shown in FIG. 7. The A/D converter 301 converts the difference signal from the sensor circuit 2B to a digital value. The difference signal from the A/D converter 301 is divided into two difference signals. One of the two difference signals is multiplied by a sine wave discrete value signal from a sine wave discrete value calculation unit 320. The other of the two difference signals is multiplied by a cosine wave discrete value signal from a cosine wave discrete value calculation unit 321. At this time, the sine wave discrete value signal and the cosine wave discrete value signal are not necessarily synchronized with the sensor signal.

Figure 9:
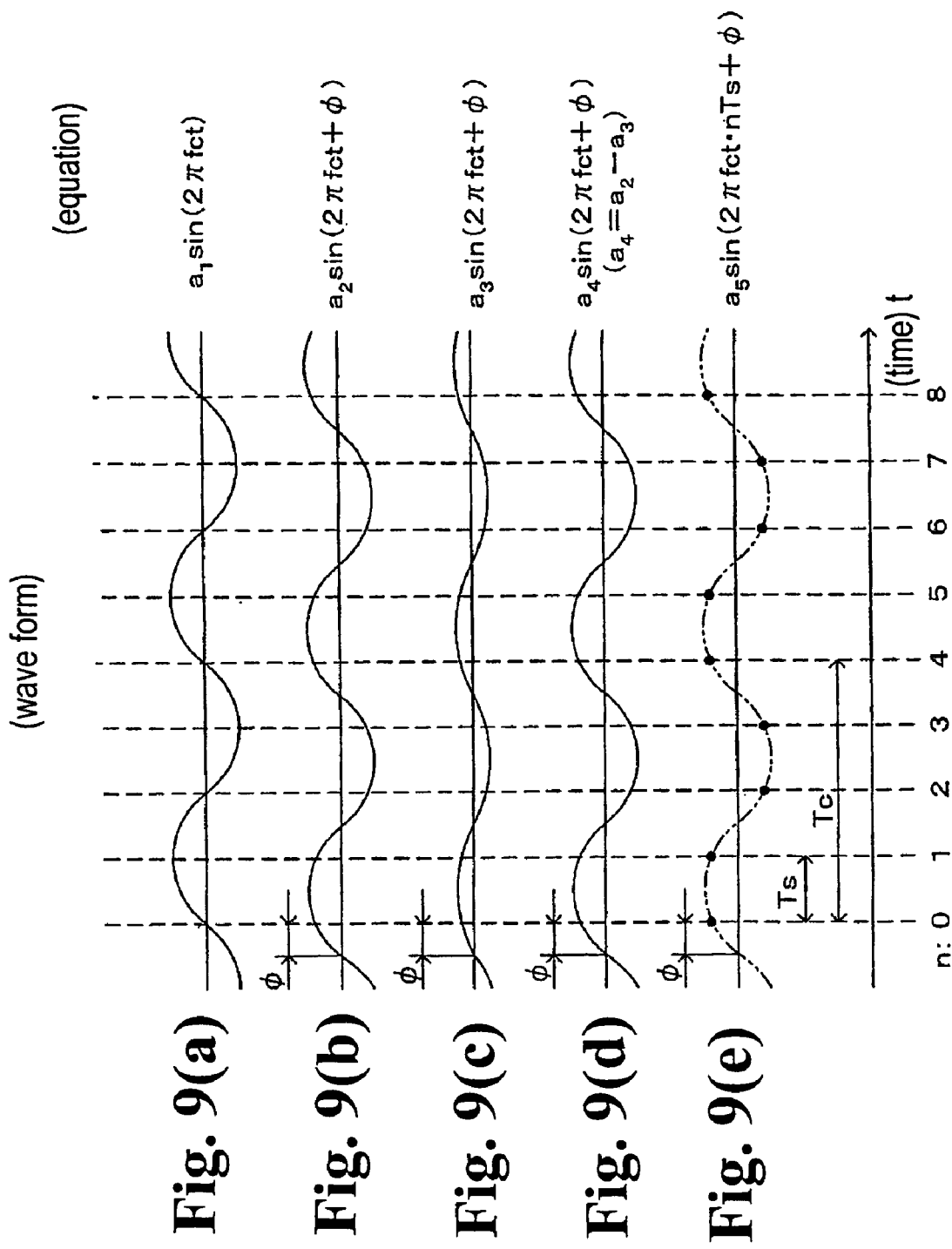
FIGS. 9(a) to 9(e) are charts showing a signal wave and an equation thereof at 9(a) to 9(e) in FIG. 8, respectively.
Figure 10:
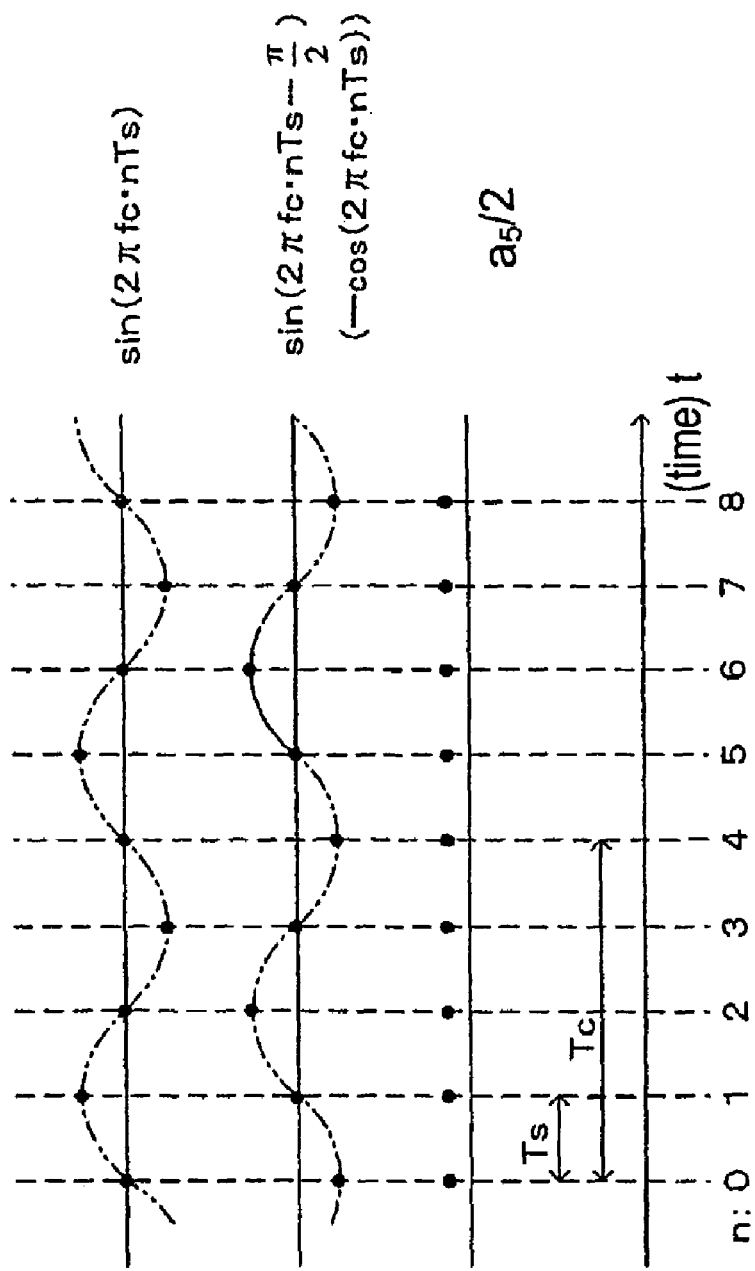
FIGS. 10(a) to 10(c) are charts showing a signal wave and an equation thereof at 10(a) to 10(c) in FIG. 8, respectively.

FIGS. 9(*a*) to 9(*e*) and FIGS. 10(*a*) to 10(*c*) are charts showing a signal wave and an equation thereof at 9(*a*) to 9(*e*) and 10(*a*) to 10(*c*) in FIG. 8, respectively. FIG. 9(*a*) shows the carrier wave to be applied to the displacement sensors 7 from the carrier wave generation unit 201. The carrier wave is given by $a_2 \cdot \sin(2\pi f_c t)$. In FIGS. 9(*a*) to 9(*e*) and FIGS. 10(*a*) to 10(*c*), the horizontal axis represents time and a sampling timing n. A discrete value is sampled at n=0, n=1, n=2, and so on in this order. $T_s$ is a sampling time interval, and when a sampling frequency is $f_s$, $T_s$ is given by $T_s=1/f_s$. $f_c$ is a carrier wave frequency and $T_c$ is a cycle period, wherein $f_s=4f_c$ is established.

When the carrier wave shown in FIG. 9(*a*) is applied to the displacement sensors 7, an AM wave $a_2 \cdot \sin(2\pi f_c t + \Phi)$ with a phase shift $\Phi$ is output from the displacement sensors 7 to the difference amplifier 203. The phase shift unit 204 shifts the carrier wave by the phase shift $\Phi$ and sends the wave as the carrier wave standard signal $a_3 \cdot \sin(2\pi f_c t + \Phi)$, thereby obtaining a wave shown in FIG. 9(*c*), wherein $a_3$ is less than $a_2$ or greater than $a_2$.

A difference signal between the signals shown in FIGS. 9(*b*) and 9(*c*) becomes one shown in FIG. 9(*d*) given by $a_4 \cdot \sin(2\pi f_c t + \Phi)$. The A/D converter 301 converts the analog signal shown in FIG. 9(*d*) from the difference amplifier 203 to a digital value, thereby obtaining a discrete value $a_5 \cdot \sin(2\pi f_c \cdot nT_s + \Phi)$ shown in FIG. 9(*e*). The sine wave discrete value signal and the cosine wave discrete value signal are shown in FIGS. 10(*a*) and 10(*b*). The sine wave discrete value signal is given by $\sin(2\pi f_c \cdot nT_s)$. The cosine wave discrete value signal has a phase shifted from the sine wave discrete value signal, and is given by $\sin(2\pi f_c \cdot nT_s - \pi/2) = -\cos(2\pi f_c \cdot nT_s)$.

The multiplication unit 314 multiplies each of the divided difference signals to obtain results (1) and (2).

$$a_5 \cdot \sin(2\pi f_c \cdot nT_s + \Phi) \cdot \sin(2\pi f_c \cdot nT_s) = \{a_5 \cdot \cos \Phi - a_5 \cdot \cos(4\pi f_c \cdot nT_s + \Phi)\}/2 \quad (1)$$

$$-a_5 \cdot \sin(2\pi f_c \cdot nT_s + \Phi) \cdot \cos(2\pi f_c \cdot nT_s) = -\{a_5 \cdot \sin \Phi + a_5 \cdot \sin(4\pi f_c \cdot nT_s + \Phi)\}/2 \quad (2)$$

Low-pass filter calculation units 315 remove harmonics contained in the signals (1) and (2) to obtain direct current components (3) and (4) of the signals (1) and (2). That is, the signal (3) is the direct current component of the signal (1) ($a_5 \cdot \cos \Phi)/2$. The signal (4) is the direct current component of the signal (2) ($-a_5 \cdot \sin \Phi)/2$. Square calculation units 322 square the signals (3) and (4), and an addition unit 323 adds results of the square calculation units 322. A square root calculation unit 324 processes a result of the addition unit 323 to obtain a signal $a_5/2$ shown in FIG. 10(*c*). Then, a gain/offset calculation unit 316 performs a gain correction and an offset correction, and a control calculation is performed based on the corrected signal.

Figure 11:
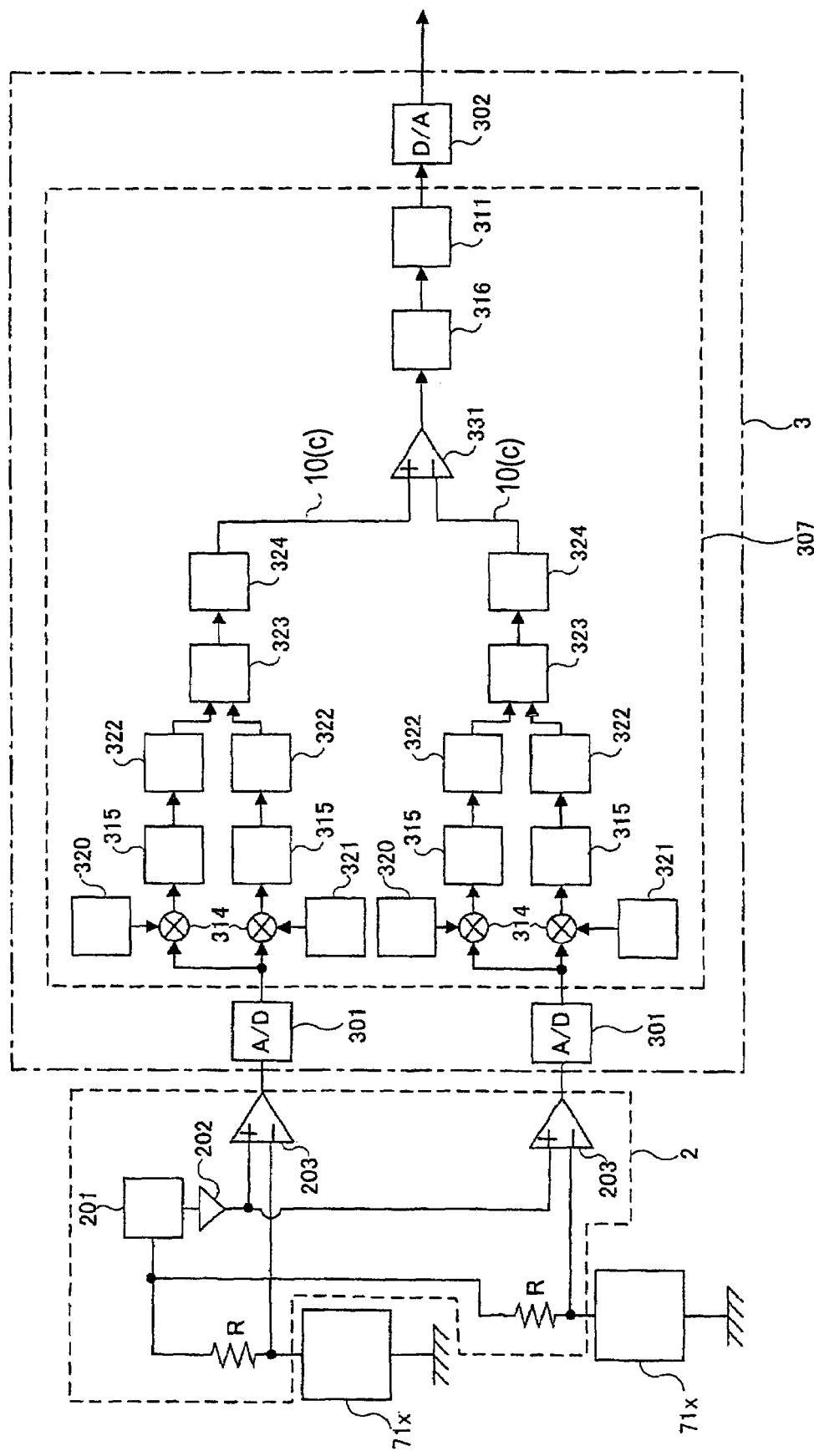
FIG. 11 is a block diagram showing a control system of a radial axis using the control system shown in FIG. 8.

FIG. 8 shows the control system applied to the axial axis, and FIG. 11 is a block diagram showing a control system applied to the radial axis. In this case, the two displacement sensors 71x are provided, so that a difference with the carrier wave standard signal is obtained relative to each of the displacement sensors 71x. Each of the differences is processed through the calculations up to the signals shown in FIG. 10(*c*). The difference calculation unit 331 calculates a difference signal relative to the signals from both of the square calculation units 322. Then, the difference signal is processed through the gain-offset correction, and the control calculation is performed based on the corrected signal.

Figure 12:
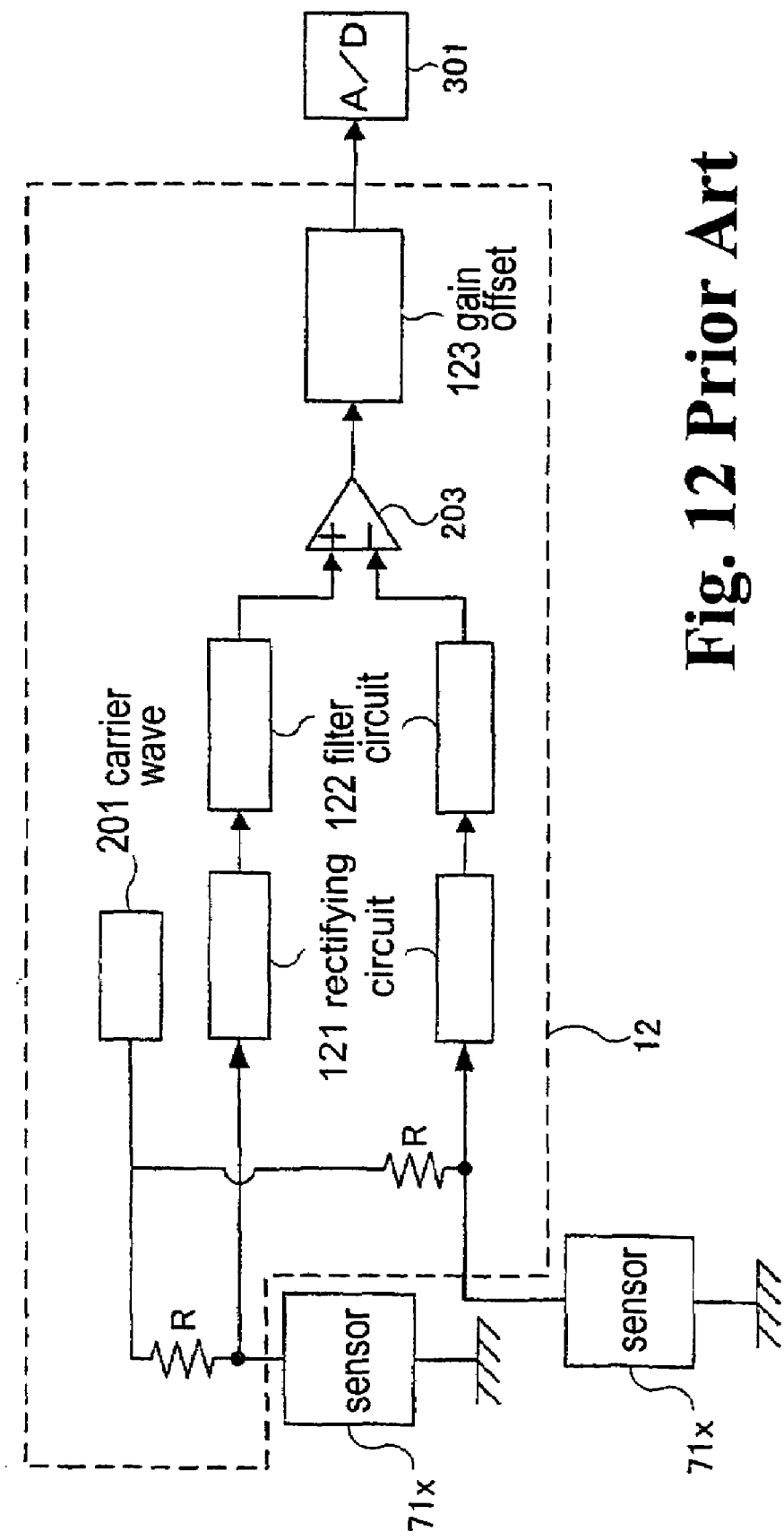
FIG. 12 is a block diagram showing a configuration of a sensor circuit of a conventional magnetic bearing device.

FIG. 12 is a block diagram showing a configuration of a sensor circuit 12 of a conventional magnetic bearing device. The sensor circuit 12 is provided with rectifying circuits 121 and filter circuits 122 for demodulating a signal in analog. The control system shown in FIG. 12 is applied to a radial axis, and each of displacement sensors 71X is provided with the rectifying circuit 121 and the filter circuit 122. The rectifying circuit 121 outputs a rectified signal including a basic wave of a carrier wave and harmonics, and a low-pass filter and a high-pass filter in the filter circuit 122 remove the basic wave and the harmonic. A difference calculation unit 203 calculates a difference, and a gain-offset correction circuit 123 performs specific gain correction and offset correction. A resultant signal is output to an A/D converter as a sensor signal.

In the conventional magnetic bearing device shown in FIG. 12, when the carrier wave has a low frequency, a size of the filter circuit 122 becomes large. On the other hand, the magnetic bearing device in the embodiment, the DSP 307 shown in FIGS. 4 and 5 performs each of the processes in the rectifying circuits 121, the filter circuits 122, and the gain-offset correction circuit 123 with software, thereby reducing a size of the circuit and lowering the frequency of the carrier wave.

The control system shown in FIG. 8, the difference signal, the sine wave discrete value signal, and the cosine wave discrete value signal are rectified in the non-synchronized state. In a second embodiment, the difference signal and the sine wave discrete value signal are rectified in a synchronized state.

Figure 13:
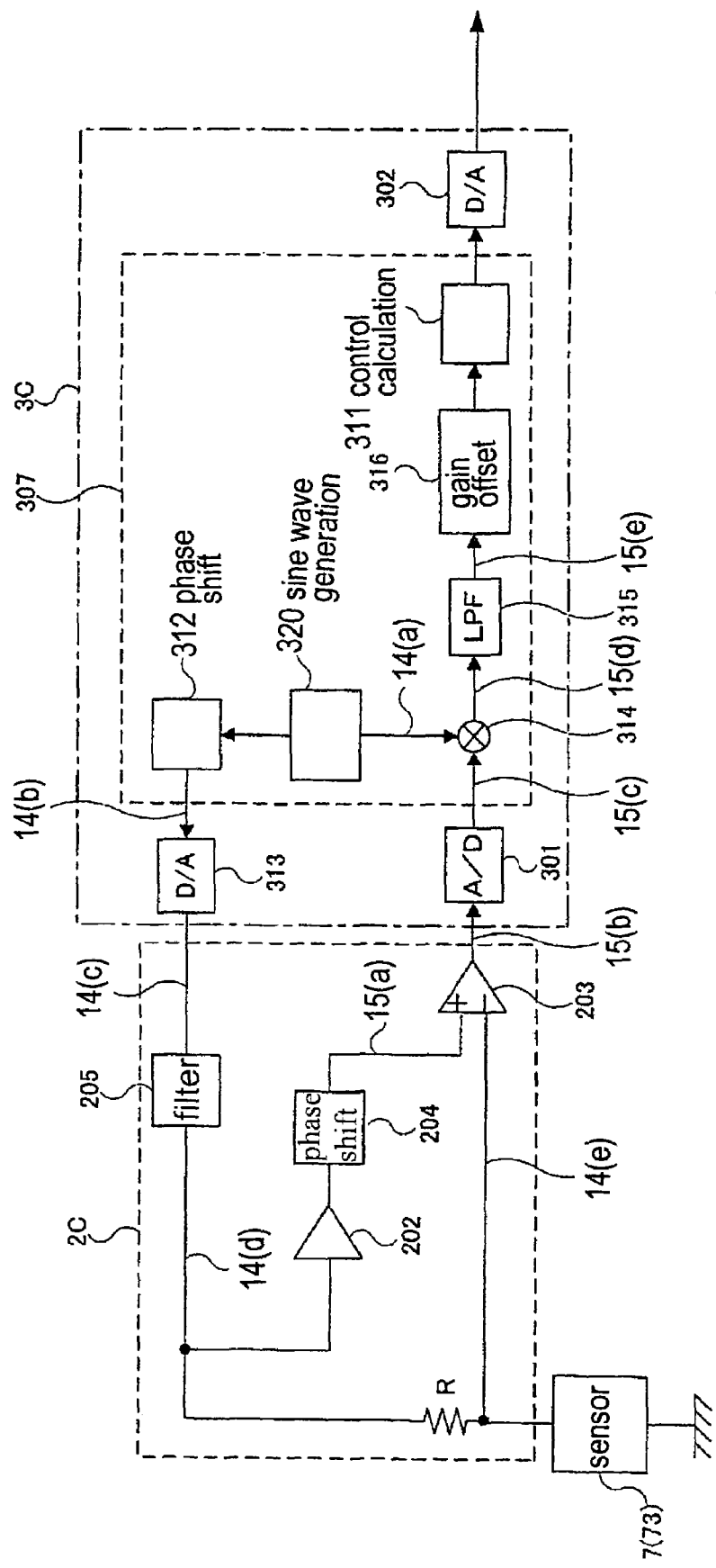
FIG. 13 is a block diagram showing a magnetic bearing device with a control system using a difference signal according to a second embodiment of the present invention.

FIG. 13 is a block diagram showing a control system for the axial axis having a sensor circuit 2C and a control circuit 3C and using the difference signal. In the control system shown in FIG. 7, the carrier wave generated in the carrier wave generation unit 201 of the sensor circuit 2B is applied to the displacement sensors 7. In the second embodiment, the sine wave discrete value signal generated in a sine wave discrete value signal generation unit 320 of the DSP 307 is converted to a digital wave with a D/A converter 313, and is applied to the displacement sensors 7 as the carrier wave.

A multiplication unit 314 of the DSP 307 multiplies the difference signal from the A/D converter 301 by the sine wave discrete value signal generated in the sine wave discrete value signal generation unit 320 to perform synchronized wave detection (rectification). Similar to the control system shown in FIG. 7, there is a phase shift between the sensor output signal and a sine wave generated in the sine wave discrete value signal generation unit 320. Accordingly, the difference signal is divided into tow components, i.e., a component same as the sine wave and a component delayed by 90 degrees. A phase shift calculation unit 312 of the DSP 307 shifts a phase of the carrier wave output to the sensor circuit 2C, so that the difference signal and the sine wave discrete value signal have a same phase upon the multiplication.

Figures 15A, 15B, 15C, 15D, 15E:
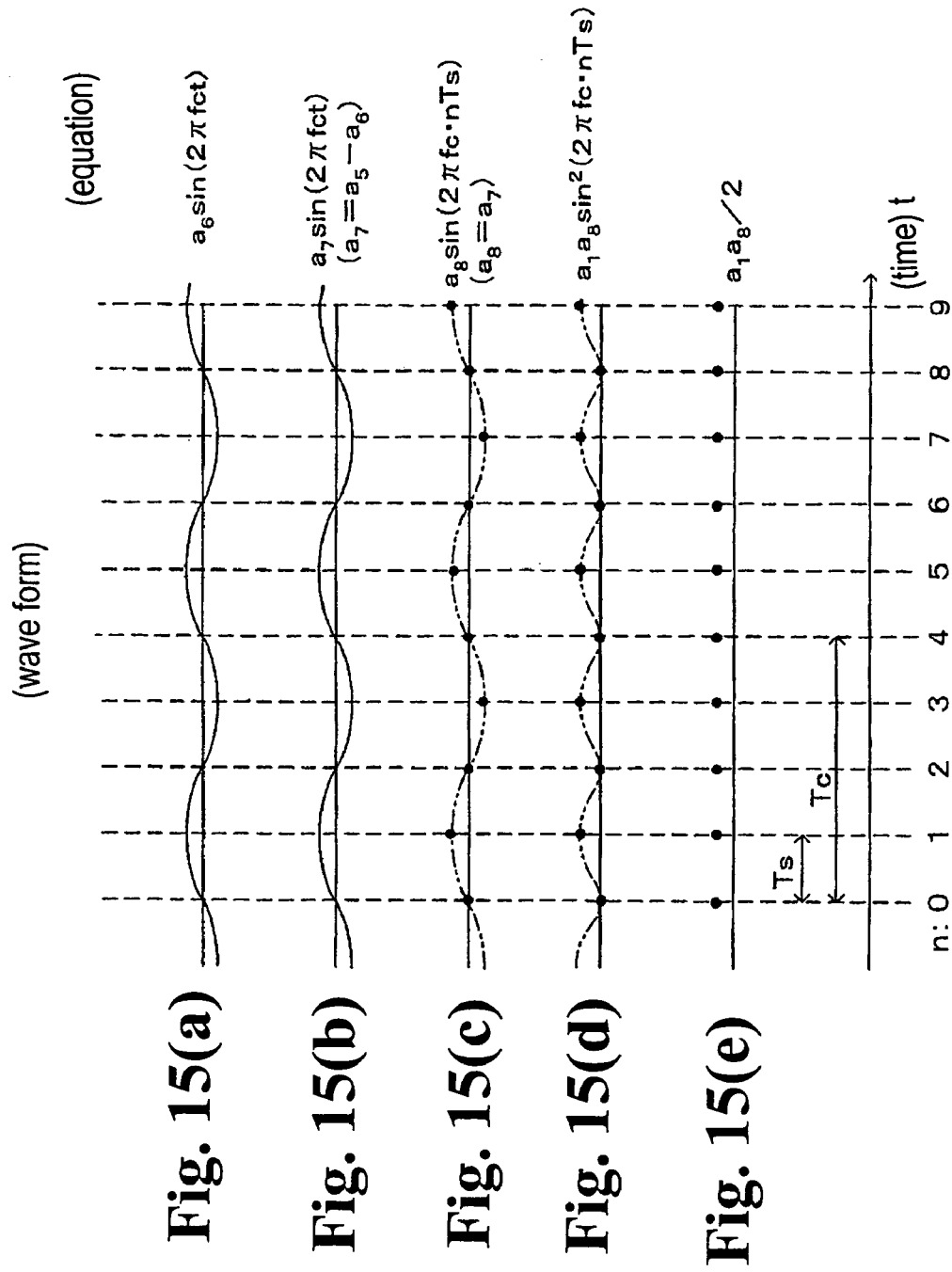
FIGS. 15(a) to 15(e) are charts showing a signal wave and an equation thereof at 15(a) to 15(e) in FIG. 13, respectively.

FIGS. 14(*a*) to 14(*e*) and FIGS. 15(*a*) to 15(*e*) are charts showing a signal wave and an equation thereof at 14(*a*) to 14(*e*) and 15(*a*) to 15(*e*) in FIG. 13, respectively. FIG. 14(*a*) shows the sine wave generated in the sine wave discrete value signal generation unit 320 and given by $a_1 \cdot \sin(2\pi f_c \cdot nT_s)$. When the phase shift calculation unit 312 of the DSP 307 shifts the phase of the sine wave discrete value signal shown in FIG. 14(*a*), a sine wave discrete value signal with a phase shifted by $\Phi$ is obtained as shown in FIG. 14(*b*) and given by $a_2 \cdot \sin(2\pi f_c \cdot nT_s - \Phi)$, in which $a_1$ is equal to $a_2$.

When the sine wave discrete value signal shown in FIG. 14(*b*) is input to the D/A converter 313, an analog signal is output as shown in FIG. 14(*c*). The wave shown in FIG. 14(*c*) contains harmonics and has a step shape. The signal is filtered through the filter circuit 205 formed of the low-pass filter and the high-pass filter, thereby obtaining a smooth carrier wave $a_4 \cdot \sin(2\pi f_c t - \Phi)$ shown in FIG. 14(*d*).

When the carrier wave shown in FIG. 14(*d*) is applied to the displacement sensors 7, an AM wave $a_5 \cdot \sin(2\pi f_c t)$ is obtained. In the embodiment, the AM wave has a phase shift $+\Phi$ relative to the carrier wave, and the phase shift calculation unit 312 shifts the phase of the AM wave by $-\Phi$ corresponding to the phase shift $+\Phi$, so that the AM wave shown in FIG. 14(*e*) and the sine wave discrete value signal shown in FIG. 14(*a*) have the same phase. FIG. 15(*a*) shows the carrier wave standard signal $a_6 \cdot \sin(2\pi f_c t)$ input to the difference amplifier 203. The carrier wave standard signal and the AM wave shown in FIG. 14(*e*) have the same phase due to the phase shift unit 204.

As shown in FIG. 15(*b*), the difference amplifier 203 obtains a difference signal $a_7 \cdot \sin(2\pi f_c t)$ between the signals shown in FIGS. 14(*e*) and 15(*a*). When the A/D converter 301 converts the difference signal shown in FIG. 15(*b*) to a digital signal, a difference signal discrete value $a_8 \cdot \sin(2\pi f_c \cdot nT_s)$ with a sampling interval $T_s$ is obtained as shown in FIG. 15(*c*). The multiplication unit 314 multiplies the difference signal discrete value from the A/D converter 301 by the sine wave discrete value signal from the sine wave discrete value signal generation unit 320, thereby obtaining a wave form shown in FIG. 15(*d*) and given by the following equation.

$$a_1 \cdot a_8 \cdot \sin^2(2\pi f_c \cdot nT_s) = a_1 \cdot a_8 \{1 + \cos(4\pi f_c \cdot nT_s)\}/2$$

As shown in the equation above, the signal shown in FIG. 15($d$) contains a direct current component $a_1 \cdot a_8/2$ and a signal $a_1 \cdot a_8 \cdot \cos(4\pi f_c \cdot nT_s)/2$ having a frequency twice higher than that of the carrier wave. The low-pass filter calculation unit 315 removes the signal $a_1 \cdot a_8 \cdot \cos(4\pi f_c \cdot nT_s)/2$ to obtain the direct current component $a_1 \cdot a_8/2$ as a displacement signal. FIG. 15($e$) shows the direct current component $a_1 \cdot a_8/2$ output from the low-pass filter calculation unit 315. Then, the gain/offset calculation unit 316 performs the gain correction and the offset correction, and the control calculation is performed based on the corrected signal.

Figure 16:
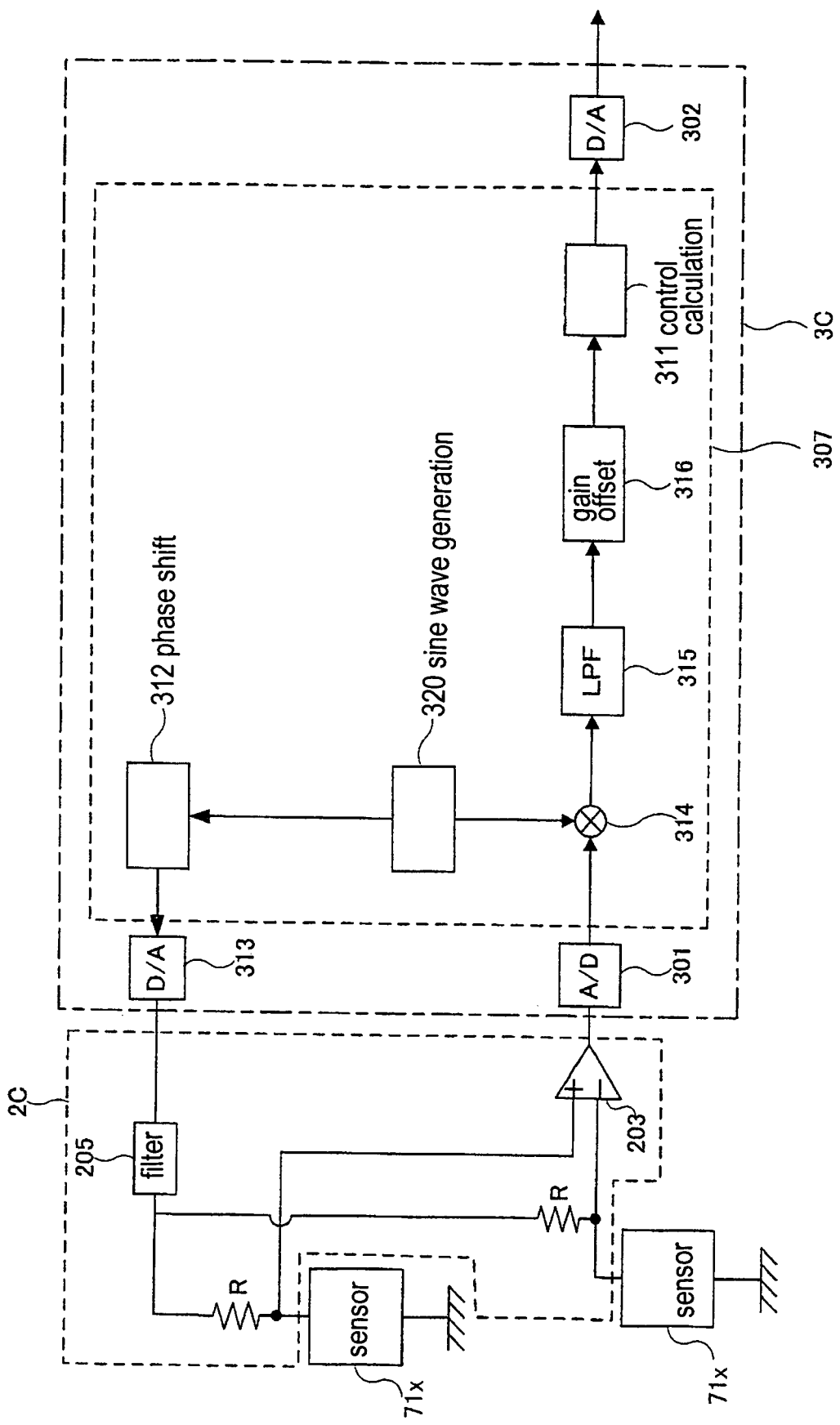
FIG. 16 is a block diagram showing a control system of a radial axis using the control system shown in FIG. 13.

FIG. 16 shows the control system in FIG. 13 applied to the radial axis. The control circuit 3$c$ is the same as that in FIG. 13, and the sensor circuit 2C is modified for the radial displacement sensors 71$x$. The sensor circuit 2C has a carrier wave generation portion different from that in the sensor circuit shown in FIG. 5. That is, instead of the carrier wave generation unit 201, the carrier discrete value generated in the sine wave discrete value calculation unit 320 of the DSP 307 is analog-converted to the carrier wave, and the carrier wave is applied to each of the displacement sensors 71$x$, similar to the control system shown in FIG. 13.

Figure 17:
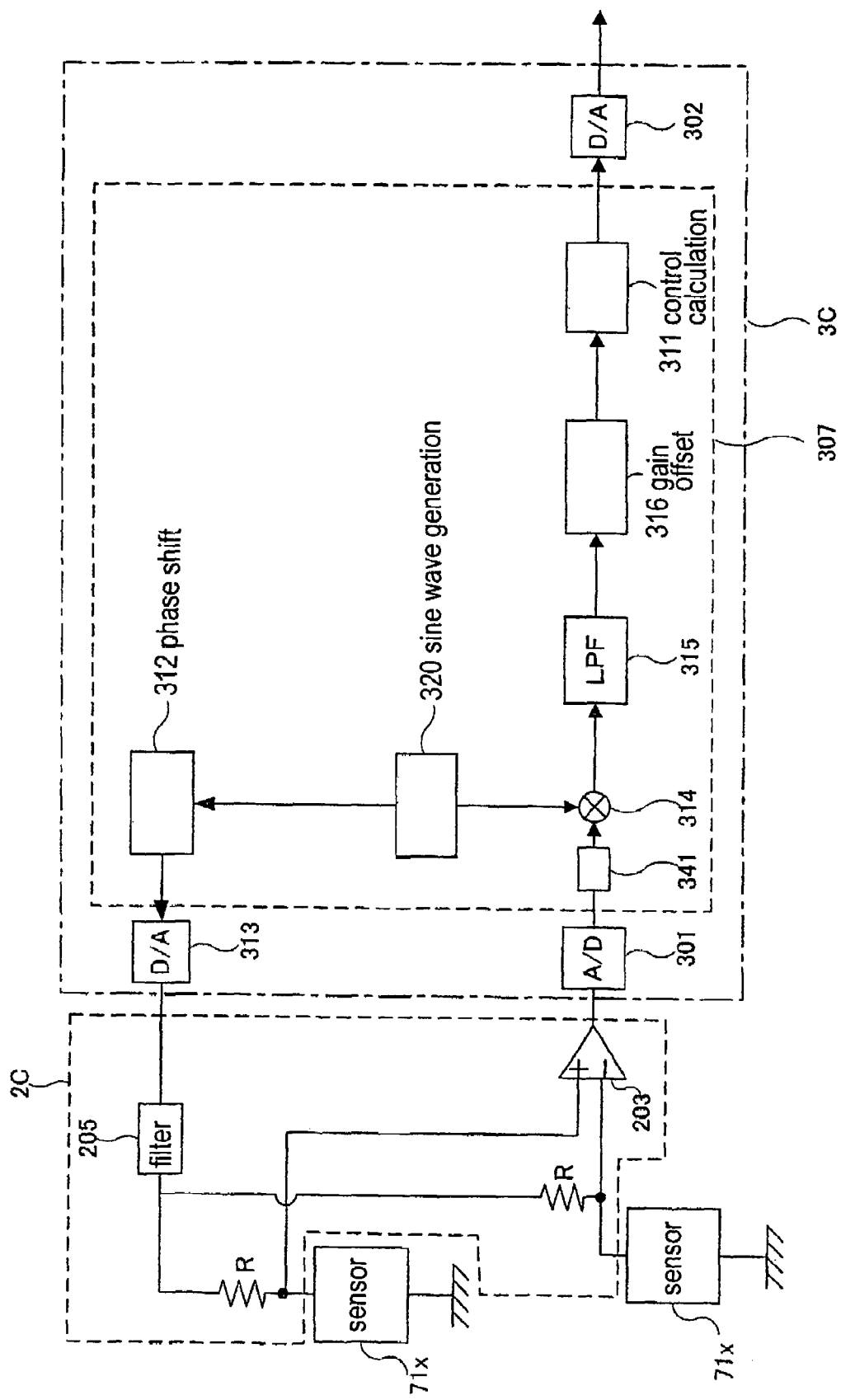
FIG. 17 is a block diagram showing a modified configuration of the control system shown in FIG. 16.

FIG. 17 is a block diagram showing a modified configuration of the control system shown in FIG. 16. When the difference signal is input from the sensor circuit 2C to the control circuit 3C, the A/D converter 301 converts the difference signal to the digital value. The digital value has typically an offset due to the A/D converter 301. When the difference signal with the offset is input to the multiplication unit 314, the multiplication result is shifted. Accordingly, it is necessary to adjust the offset of the difference signal relative to the A/D converter 301 individually.

The control system shown in FIG. 17 is provided with a filter calculation unit 341 between the A/D converter 301 and the multiplication unit 314 for performing a band-pass process and a high-pass process. The filter calculation unit 341 removes the offset in the difference signal, thereby eliminating the offset adjustment. The filter calculation unit 341 may be applicable to the control systems shown in FIGS. 4 to 8, 11, and 13.

In the second embodiment described above, the control system of the axial displacement sensors 7 is shown in FIG. 13, and the control system of one of the four-axis radial displacement sensors is shown in FIG. 16. The phase shift calculation unit 312 of the DSP 307 shifts the phase of the sine wave discrete value signal. Accordingly, the difference signal from the A/D converter 301 has the phase same as that of the sine wave discrete value signal generated in the sine wave discrete value signal generation unit 320 upon the multiplication of the multiplication unit 314.

The difference signal from the sensor circuit 2C has a different phase shift relative to each axis due to a difference in structures between the axial displacement sensors 73 and the radial displacement sensors 71$x$, or a variance among the radial displacement sensors 71$x$. Therefore, the phase shift calculation unit 312 is provided for each axis for shifting the phase of the sine wave discrete value signal by an amount according to each axis. After the phase shift calculation unit 312 shifts the phase, the D/A converters 313 convert the sine wave discrete value signals to the analog wave and output the analog wave to the sensor circuit 2C.

Figure 18:
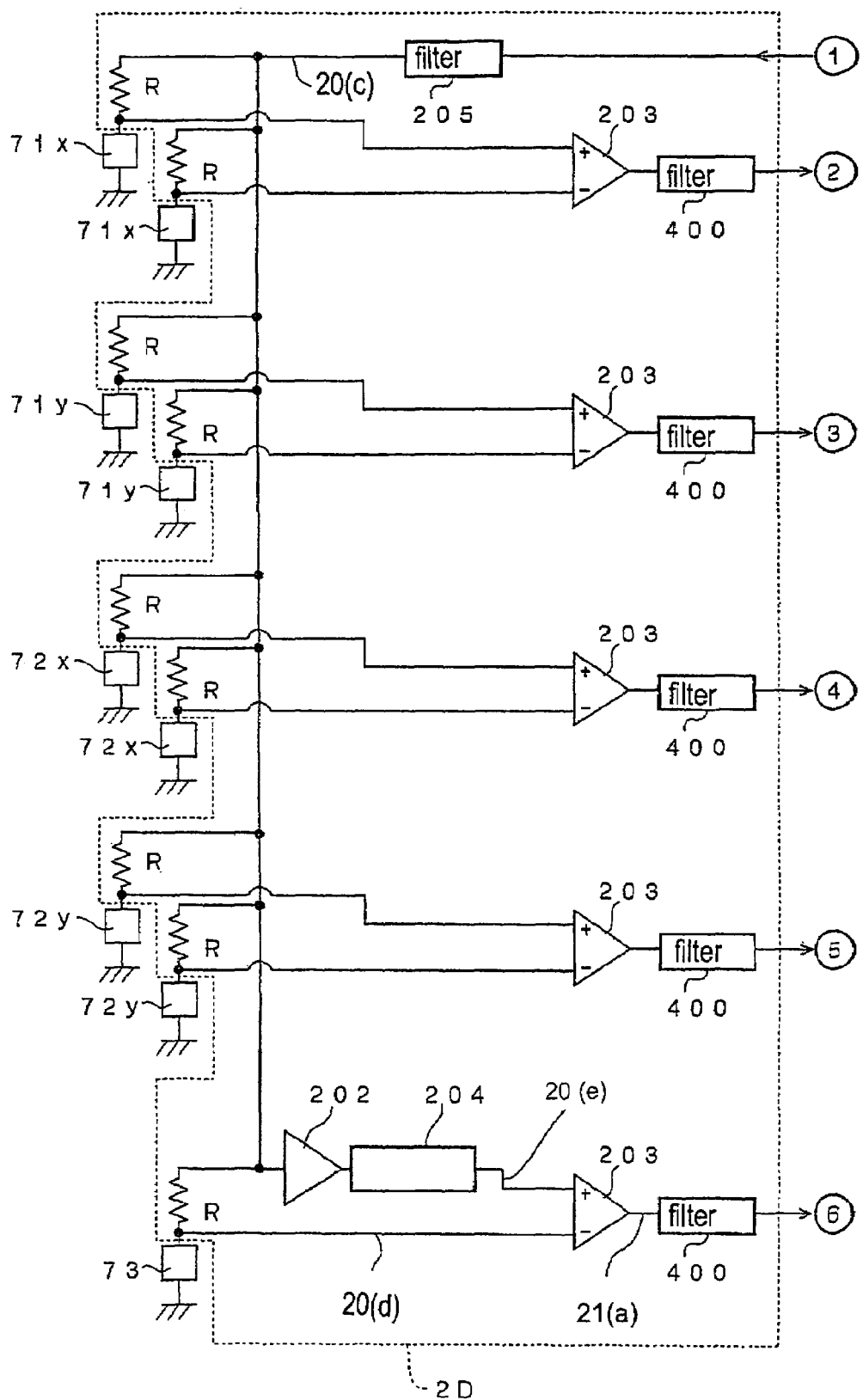
FIG. 18 is a block diagram showing a sensor circuit of a control system of a magnetic bearing device according to a third embodiment of the present invention.
Figure 19:
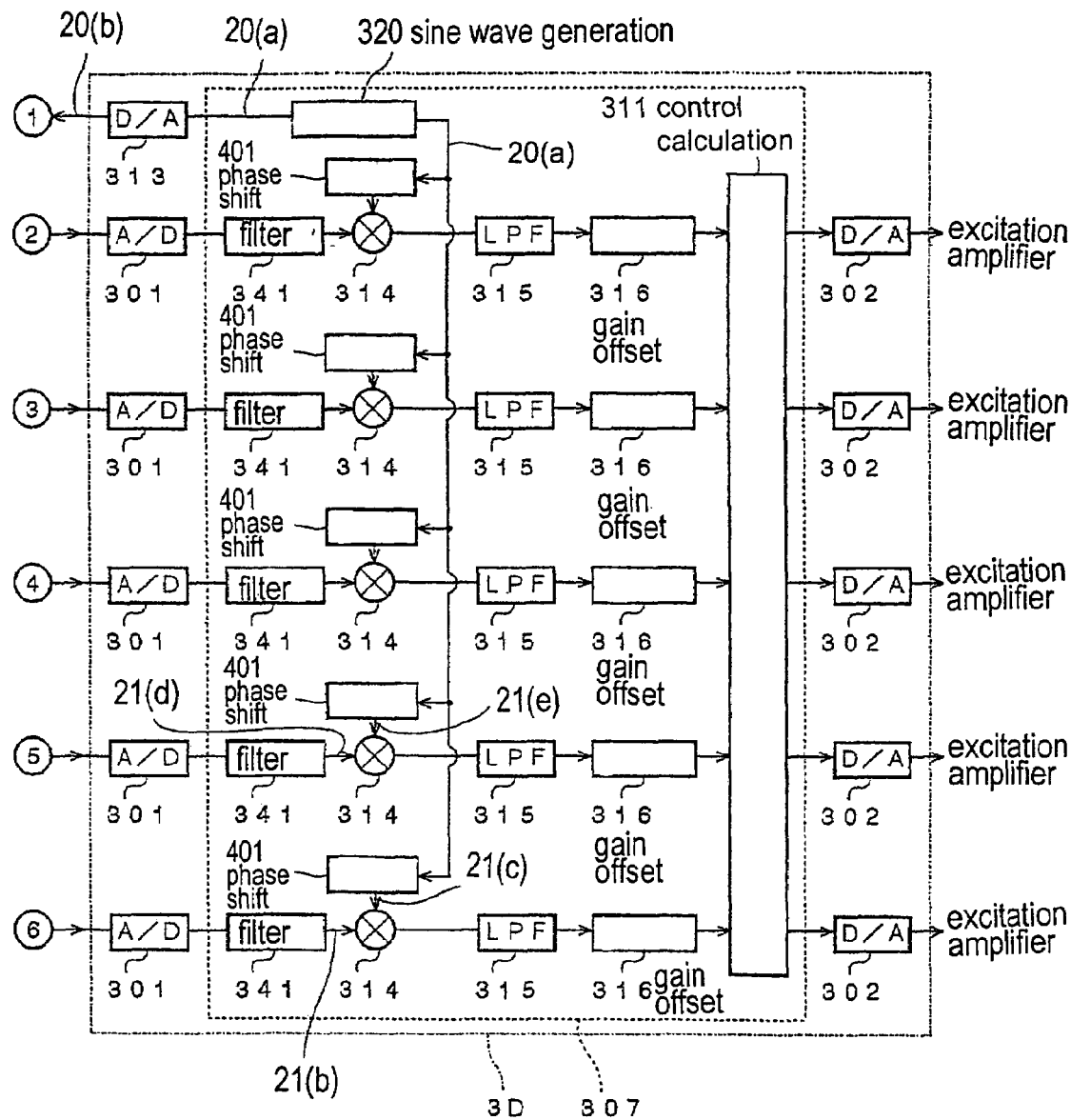
FIG. 19 is a block diagram showing a control circuit of the control system.

FIG. 18 and FIG. 19 are block diagrams showing a control system of all of five-axis displacement sensors according to a third embodiment of the present invention. FIG. 18 shows each of the displacement sensors 71$x$, 71$y$, 72$x$, 72$y$, and 73, and a sensor circuit 2D. FIG. 19 shows a control circuit 3D. The displacement sensors 71$x$, 71$y$, 72$x$, and 72$y$ correspond to the radial electromagnet 51$x$, 51$y$, 52$x$, and 52$y$ shown in FIG. 2, respectively. Components same as those in FIGS. 13 and 16 are designated by the same reference numerals, and components different from those in FIGS. 13 and 16 will be mainly explained.

The sine wave discrete value calculation unit 320 in the control circuit 3D shown in FIG. 19 generates the sine wave discrete value as a basic signal of the carrier wave. When the sine wave discrete value is converted to an analog wave to obtain the carrier wave, the output sampling frequency is preferably set at a highest value within digital calculation performance limit of the DSP, thereby reducing an order number of the analog filter for removing harmonics after the D/A output.

The D/A converter 313 converts the sine wave discrete value to an analog wave, and the filter circuit 205 shown in FIG. 18 removes harmonics and offset of the sine wave discrete value. At this time, the filter circuit 205 outputs the carrier wave signal having a phase shifted from a standard phase of the basic signal. The carrier wave signal from the filter circuit 205 is applied to each of the sensors 71$x$, 71$y$, 72$x$, 72$y$, and 73 through resistances.

Each of the sensors 71$x$, 71$y$, 72$x$, 72$y$, and 73 outputs an AM wave modulated in amplitude according to a change in impedance. The radial sensors 71$x$, 71$y$, 72$x$, and 72$y$ output a pair of sensor signals to the difference amplifiers 203, similar to FIG. 16, and the difference amplifiers 203 output the difference signals. The axial displacement sensor 73 outputs the AM wave having a phase shifted relative to the carrier wave signal applied to the displacement sensor 73. Accordingly, the phase shift unit 204 shifts the phase of the carrier wave signal corrected by the gain correction unit 202 according to the shift of the AM wave, and the signal is input to the difference amplifier 203.

Filter circuits 400 perform a band-pass process relative to the difference signals from the difference amplifiers 203 with the carrier wave frequency as a center, thereby improving the S/N ratio in the following wave detection process. The A/D converters 301 shown in FIG. 19 convert the signals from the filter circuits 400 to the digital signals. The filter calculation units 341 perform the band-pass process and the high-pass process on the converted digital signals to remove the offset in the difference signals. The multiplication units 314 receive the difference signals from the filter calculation units 341 and the signals from phase shift calculation units 401.

The difference signals input to the multiplication units 314 have phases shifted from the standard phase of the basic signal generated in the sine wave discrete value calculation unit 320. In particular, the phases are shifted when the signals are converted to the analog signals and pass through the analog filters, and when the signals are applied to the displacement sensors and pass through the analog circuits. Further, the A/D converters 301 convert the difference signals from the sensors at different timings for each of the axes, thereby causing relative phase shifts among the axes.

Accordingly, the phase shift calculation units 401 shift the phases of the sine wave discrete values from the sine wave discrete value calculation unit 320 by different shift amounts according to the phase shifts of the difference signals. As a result, the difference signals have the phases same as those of the sine wave discrete values. A process after the multiplication units 314 is the same as that shown in FIGS. 13 and 16, and explanation thereof is omitted.

FIGS. 20($a$) to 20($e$) and 21($a$) to 21($e$) are charts showing a signal wave and an equation thereof at 20($a$) to 20($e$) and 21($a$) to 21($e$) in FIGS. 18 and 19, respectively. In the third embodiment, in order to make the explanation simple, only the phase shifts of the displacement sensors will be explained similar to the second embodiment. FIG. 20(a) shows the sine wave discrete value generated in the sine wave discrete value calculation unit 320 and given by $a_1 \cdot \sin(2\pi f_c \cdot nT_s)$. $T_s$ is a sampling time interval, and $f_c$ is a carrier wave frequency, similar to the first and second embodiments.

When the D/A converter 313 converts the signal shown in FIG. 20(a), a signal having a step form is obtained as shown in FIG. 20(b). The filter calculation unit 205 processes the signal to obtain the carrier wave $a_4 \cdot \sin(2\pi f_c t)$ with a smooth form as shown in FIG. 20(c). The carrier wave shown in FIG. 20(c) is applied to the displacement sensor 73 to obtain the AM wave $a_5 \cdot \sin(2\pi f_c t + \Phi)$ with a phase shifted from that of the carrier wave by $+\Phi$ as shown in FIG. 20(d).

FIG. 20(e) shows the carrier wave standard signal $a_6 \cdot \sin(2\pi f_c t + \Phi)$ input to the difference amplifier 203. The carrier wave standard signal has the phase same as that of the AM wave $a_5 \cdot \sin(2\pi f_c t + \Phi)$ due to the phase shift unit 204. FIG. 21(a) shows the difference signal $a_7 \cdot \sin(2\pi f_c t + \Phi)$ output from the difference amplifier 203. The A/D converter 301 converts the analog signal to the digital signal, and the filter calculation unit 341 outputs the signal shown in FIG. 21(b) to the multiplication unit 314.

The phase shift calculation unit 401 shifts the phase of the sine wave discrete value $a_1 \cdot \sin(2\pi f_c \cdot nT_s)$ generated in the sine wave discrete value calculation unit 320 by the phase shift $+\Phi$ same as that of the AM wave $a_5 \cdot \sin(2\pi f_c t + \Phi)$, and outputs the signal to the multiplication unit 314. FIG. 21(c) shows the signal $a_2 \cdot \sin(2\pi f_c \cdot nT_s + \Phi)$ input from the phase shift calculation unit 401 to the multiplication unit 314.

The A/D converters 301 provided for the displacement sensors 71x, 71y, 72x, 72y, and 73 convert the difference signals to the digital signals at different timings. FIGS. 21(d) and 21(e) show the signals of the displacement sensors 72y at 21(d) and 21(e). In this case, the analog signal is converted to the digital signal at a timing delayed from that of the displacement sensor 73 by $\Delta t$. Accordingly, the phase shift calculation unit 401 shifts the phase of the sine wave discrete value including $\Delta t$. The signal shown in FIG. 21(d) is given by $a_8 \cdot \sin(2\pi f_c \cdot nT_{s+\Phi 1} + 2\pi f_c \cdot \Delta t)$, and the signal shown in FIG. 21(e) is given by $a_2 \cdot \sin(2\pi f_c \cdot nT_s + \Phi_1 + 2\pi f_c \cdot \Delta t)$.

As described above, in the third embodiment, the carrier wave output from the single D/A converter 313 is applied to each of the displacement sensors 71x, 71y, 72x, 72y, and 73. The sine wave discrete values are multiplied by the difference signals output from the displacement sensor after the phase shift. Accordingly, it is possible to reduce the number of the D/A converter 313 as compared with the second embodiment, thereby reducing cost and a size of the circuits. In the second embodiment, it is necessary to provide the D/A converter 313 for each of the axes, i.e., the five D/A converters for the magnetic bearing device of the five-axis type. In the embodiment, the five-axis control system is shown, and the system is applicable to a three-axis control.

In the first to third embodiments, the multiplication unit 314 multiplies the two signals having the substantially same phase, and the phase may be reversed (shifted by 180 degrees). In the case of the reversed phase, a sign of the multiplication result is changed to obtain a value with a sign same as that in the case of the same phase.

In the embodiments, the magnetic bearing device is applied to the turbo-molecular pump, and may be applicable to a magnetic bearing device in a machine tool or a vacuum delivery apparatus. The square calculation unit 322, the addition unit 323, and the square root calculation unit 324 shown in FIGS. 8 and 11 correspond to a combine calculation unit.

As described above, instead of the conventional analog process, the rectifying process, the filter process, the gain-offset process are performed through the digital calculation with software, thereby reducing a size of the circuits. It is also possible to be made a low frequency of the carrier wave without increasing a size of the circuits.

Further, according to the third aspect of the invention, the difference between the sensor signal and the carrier wave standard signal with specific amplitude is obtained. Accordingly, it is possible to obtain the information in the displacement direction as well as the displacement amount of the rotor, and to improve the S/N ratio. According to the fourth aspect of the invention, the sensor signal and the carrier wave standard signal have the substantially same phase, thereby improving the S/N ratio. According to the fifth aspect of the invention, the carrier wave standard signal having the substantially same phase as the sensor signal is multiplied in the demodulation process through the digital calculation, thereby reducing a size of the circuits as compared to the conventional analog process.

Further, according to the sixth and seventh aspects of the invention, the difference signal is multiplied by the sine wave discrete value and the cosine wave discrete value in the demodulation process in the non-synchronized state. The demodulation process is performed through the digital calculation, thereby reducing a size of the circuit as compared to the conventional analog process. According to the eighth and ninth aspects, it is possible to reduce the number of the D/A converters, thereby reducing cost and a size of the circuit. According to the eleventh aspect of the invention, the band-pass process and the high-pass calculation process are performed on the difference converted to the digital signal, thereby removing the offset generated in the A/D conversion and improving the demodulation process.

The disclosure of Japanese Patent Application No. 2003-190842, filed on Jul. 3, 2003, is incorporated in the application.

While the invention has been explained with reference to the specific embodiments of the invention, the explanation is illustrative and the invention is limited only by the appended claims.

What is claimed is:

1. A magnetic bearing device comprising:
   an electromagnet for supporting a member without contact;
   an excitation amplifier for supplying an excitation current to the electromagnet;
   a carrier wave generation device for generating a carrier wave;
   sensor means having at least one sensor for detecting displacement of the member, said sensor means modulating the carrier wave to output a sensor signal according to a position of the member and including a standard signal generation device for generating a carrier wave standard signal with specific amplitude according to the carrier wave, and a difference calculation device for calculating a difference between the sensor signal and the carrier wave standard signal;
   an A/D conversion device for converting the difference to a digital value;
   a demodulation calculation device for demodulating the sensor signal converted to the digital value through a digital calculation process;

a control device for controlling the excitation amplifier according to a calculation result of the demodulation calculation device; and a phase shift device for shifting a phase of the carrier wave standard signal so that the carrier wave standard signal has a phase substantially same as that of the sensor signal.

2. A magnetic bearing device comprising:

an electromagnet for supporting a member without contact;

an excitation amplifier for supplying an excitation current to the electromagnet;

a carrier wave generation device for generating a carrier wave;

sensor means having at least one sensor for detecting displacement of the member, said sensor means modulating the carrier wave to output a sensor signal according to a position of the member;

an A/D conversion device for converting the sensor signal to a digital value;

a demodulation calculation device for demodulating the sensor signal converted to the digital value through a digital calculation process; and a control device for controlling the excitation amplifier according to a calculation result of the demodulation calculation device, wherein said sensor means includes a pair of sensors disposed with the member in between for modulating the carrier wave to output sensor signals according to a position of the member, and a difference calculation device for calculating a difference of the sensor signals from the pair of sensors so that the A/D conversion device converts the difference to a digital value, and wherein said demodulation calculation device includes a sine wave discrete value generation unit for generating a sine wave discrete value through a digital calculation process, a multiplication unit for multiplying the sine wave discrete value and the difference converted to the digital value, and a low-pass calculation unit for performing a low-pass process relative to a multiplication result of the multiplication unit; and said carrier wave generation device includes a phase shift calculation device for shifting a phase of the sine wave discrete value through a digital calculation process so that the sine wave discrete value has a phase substantially same as that of the difference, and a D/A conversion unit for converting the sine wave discrete value with the shifted phase through D/A conversion to generate the carrier wave, said control device controlling the excitation amplifier according to a calculation result of the low-pass calculation unit.

3. A magnetic bearing device according to claim 2, wherein said sine wave discrete value and each of sine wave discrete value have a phase substantially inverted as that of the difference and each of the differences converted to the digital value.

4. A magnetic bearing device according to claim 2, further comprising a filter calculation device for performing a band-pass calculation process or a high-pass calculation process relative to each of the differences converted to the digital value by the A/D conversion device to send a signal to the multiplication unit.

5. A magnetic bearing device an electromagnet for supporting a member without contact;

an excitation amplifier for supplying an excitation current to the electromagnet;

a carrier wave generation device for generating a carrier wave;

sensor means having at least one sensor for detecting displacement of the member, said sensor means modulating the carrier wave to output a sensor signal according to a position of the member;

an A/D conversion device for converting the sensor signal to a digital value;

a demodulation calculation device for demodulating the sensor signal converted to the digital value through a digital calculation process; and a control device for controlling the excitation amplifier according to a calculation result of the demodulation calculation device, wherein said sensor means includes a standard signal generation device for generating a carrier wave standard signal with specific amplitude according to the carrier wave, and a difference calculation device for calculating a difference between the sensor signal and the carrier wave standard signal so that the A/D conversion device converts the difference to a digital value, and wherein said demodulation calculation device includes a sine wave discrete value generation unit for generating a sine wave discrete value through a digital calculation process; a cosine wave discrete value generation unit for generating a cosine wave discrete value through a digital calculation process; a multiplication unit for dividing the difference converted to the digital value into two differences, multiplying the sine wave discrete value and one of the two differences, and multiplying the cosine wave discrete value and the other of the two differences; a low-pass calculation unit for performing a low-pass process relative to each of multiplication results of the multiplication unit; and a combine calculation unit for calculating squares of each of multiplication results of the low-pass calculation unit, and calculating a root square of a sum of the squares, said control device controlling the excitation amplifier according to a calculation result of the combine calculation unit.

6. A magnetic bearing device comprising:

an electromagnet for supporting a member without contact;

an excitation amplifier for supplying an excitation current to the electromagnet;

a carrier wave generation device for generating a carrier wave;

a pair of sensors disposed with the member in between for modulating the carrier wave to output sensor signals according to a position of the member;

a standard signal generation device for generating a carrier wave standard signal with specific amplitude according to the carrier wave;

a difference calculation device for calculating differences of the sensor signals from the pair of sensors and the carrier wave standard signal, respectively;

an A/D conversion device for converting each of the differences calculated by the difference calculation device to a digital value;

a demodulation calculation device including a sine wave discrete value generation unit for generating a sine wave discrete value relative to each of the differences converted to the digital value; a cosine wave discrete value generation unit for generating a cosine wave discrete value relative to each of the differences converted to the digital value; a multiplication unit for dividing each of the differences converted to the digital value into two divided signals, multiplying the sine wave discrete value by one of the two divided signals, and multiplying the cosine wave discrete value by the other of the two divided signals; a low-pass calculation unit for performing a low-pass process relative to each of multiplication results of the multiplication unit; and a combine calculation unit for calculating squares of each of multiplication results of the low-pass calculation unit, and calculating a root square of a sum of the squares, said demodulation calculation device calculating a difference of multiplication results of the combine calculation unit to perform a demodulation calculation; and a control device for controlling the excitation amplifier according to a calculation result of the demodulation calculation device.

7. A magnetic bearing device comprising:

an electromagnet for supporting a member without contact;

an excitation amplifier for supplying an excitation current to the electromagnet;

a carrier wave generation device for generating a carrier wave;

sensor means having at least one sensor for detecting displacement of the member, said sensor means modulating the carrier wave to output a sensor signal according to a position of the member;

an A/D conversion device for converting the sensor signal to a digital value;

a demodulation calculation device for demodulating the sensor signal converted to the digital value through a digital calculation process; and a control device for controlling the excitation amplifier according to a calculation result of the demodulation calculation device, wherein said sensor means includes a pair of sensors disposed with the member in between for modulating the carrier wave to output sensor signals according to a position of the member, and a difference calculation device for calculating a difference of the sensor signals from the pair of sensors so that the A/D conversion device converts the difference to a digital value, and wherein said sensor means has a plurality of sensors for controlling multi-axis, said carrier wave generation device including a sine wave discrete value generation unit for generating a sine wave discrete value through a digital calculation process, and a D/A conversion unit for converting the sine wave discrete value through D/A conversion to generate the carrier wave and sending the carrier wave to each of the sensors.

8. A magnetic bearing device according to claim 7, wherein said demodulation calculation device includes a phase shift calculation unit for shifting a phase of the sine wave discrete value through a digital calculation process relative to each of the differences converted to the digital value so that each of the sine wave discrete value has a phase substantially same as that of each of the differences converted to the digital value; a multiplication unit for multiplying each of the differences converted to the digital value and each of the sine wave discrete value with each of the phase shifted by the phase shift calculation unit; and a low-pass calculation unit for performing a low-pass process relative to each of multiplication results of the multiplication unit, said control device controlling the excitation amplifier according to calculation results of the low-pass calculation unit.

9. A magnetic bearing device according to claim 8, wherein said sine wave discrete value and each of sine wave discrete value have a phase substantially inverted as that of the difference and each of the differences converted to the digital value.

10. A magnetic bearing device according to claim 8, further comprising a filter calculation device for performing a band-pass calculation process or a high-pass calculation process relative to each of the differences converted to the digital value by the A/D conversion device to send a signal to the multiplication unit.

11. A magnetic bearing device comprising:

an electromagnet for supporting a member without contact;

an excitation amplifier for supplying an excitation current to the electromagnet;

a carrier wave generation device for generating a carrier wave;

sensor means having at least one sensor for detecting displacement of the member, said sensor means modulating the carrier wave to output a sensor signal according to a position of the member;

an A/D conversion device for converting the sensor signal to a digital value;

a demodulation calculation device for demodulating the sensor signal converted to the digital value through a digital calculation process; and a control device for controlling the excitation amplifier according to a calculation result of the demodulation calculation device, wherein said sensor means includes a standard signal generation device for generating a carrier wave standard signal with specific amplitude according to the carrier wave, and a difference calculation device for calculating a difference between the sensor signal and the carrier wave standard signal so that the A/D conversion device converts the difference to a digital value, and wherein said demodulation calculation device includes a sine wave discrete value generation unit for generating a sine wave discrete value through a digital calculation process, a multiplication unit for multiplying the sine wave discrete value and the difference converted to the digital value, and a low-pass calculation unit for performing a low-pass process relative to a multiplication result of the multiplication unit; and said carrier wave generation device includes a phase shift calculation device for shifting a phase of the sine wave discrete value through a digital calculation process so that the sine wave discrete value has a phase substantially same as that of the difference, and a D/A conversion unit for converting the sine wave discrete value with the shifted phase through D/A conversion to generate the carrier wave, said control device controlling the excitation amplifier according to a calculation result of the low-pass calculation unit.

12. A magnetic bearing device comprising:

an electromagnet for supporting a member without contact;

an excitation amplifier for supplying an excitation current to the electromagnet;

a carrier wave generation device for generating a carrier wave;

sensor means having at least one sensor for detecting displacement of the member, said sensor means modulating the carrier wave to output a sensor signal according to a position of the member;

an A/D conversion device for converting the sensor signal to a digital value;

a demodulation calculation device for demodulating the sensor signal converted to the digital value through a digital calculation process; and a control device for controlling the excitation amplifier according to a calculation result of the demodulation calculation device, wherein said sensor means includes a standard signal generation device for generating a carrier wave standard signal with specific amplitude according to the carrier wave, and a difference calculation device for calculating a difference between the sensor signal and the carrier wave standard signal so that the A/D conversion device converts the difference to a digital value, and wherein said sensor means has a plurality of sensors for controlling multi-axis, said carrier wave generation device including a sine wave discrete value generation unit for generating a sine wave discrete value through a digital calculation process, and a D/A conversion unit for converting the sine wave discrete value through D/A conversion to generate the carrier wave and sending the carrier wave to each of the sensors.

* * * * *